US009870178B2

(12) United States Patent
Asai

(10) Patent No.: US 9,870,178 B2
(45) Date of Patent: Jan. 16, 2018

(54) COMMUNICATION DEVICE, AND METHOD AND COMPUTER READABLE MEDIUM FOR THE SAME

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/221,965

(22) Filed: Jul. 28, 2016

(65) Prior Publication Data
US 2016/0335033 A1 Nov. 17, 2016

Related U.S. Application Data

(63) Continuation of application No. 14/200,143, filed on Mar. 7, 2014, now Pat. No. 9,423,986.

(30) Foreign Application Priority Data

Mar. 7, 2013 (JP) ................................. 2013-045317

(51) Int. Cl.
| | |
|---|---|
| *G06F 3/12* | (2006.01) |
| *H04N 1/00* | (2006.01) |
| *H04N 1/32* | (2006.01) |
| *H04N 1/327* | (2006.01) |

(52) U.S. Cl.
CPC .......... *G06F 3/1205* (2013.01); *G06F 3/1232* (2013.01); *G06F 3/1236* (2013.01);
(Continued)

(58) Field of Classification Search
CPC .... G06F 3/1205; G06F 3/1232; G06F 3/1292; G06F 3/1255; G06F 3/1236;
(Continued)

(56) References Cited

U.S. PATENT DOCUMENTS

| 8,285,210 B2 | 10/2012 | Oshima et al. |
| 2002/0097419 A1 | 7/2002 | Chang et al. |

(Continued)

FOREIGN PATENT DOCUMENTS

| JP | 2007-166538 A | 6/2007 |
| JP | 2008-077565 A | 4/2008 |

(Continued)

OTHER PUBLICATIONS

Dec. 6, 2016—(JP) Notification of Reasons for Rejection—App 2013-045317.
Mar. 14, 2017—(JP) Decision of Rejection—App 2013-045317.

*Primary Examiner* — Neil R McLean
(74) *Attorney, Agent, or Firm* — Banner & Witcoff, Ltd.

(57) ABSTRACT

A communication device including a processor configured to, when executing processor-executable instructions stored in a storage unit, perform determining a first configurable range including setting values stored in the storage unit, acquiring, from an image processing apparatus via a communication unit, a second configurable range including setting values for image processing executable by the image processing apparatus, determining whether the first configurable range is equal to the second configurable range, when determining that the first configurable range is equal to the second configurable range, transmitting an image processing instruction to perform an image processing operation according to the setting values of the first configurable range stored in the storage unit, to the image processing apparatus via the communication unit, and when determining that the first configurable range is different from the second configurable range, restricting transmission of the image processing instruction to the image processing apparatus.

17 Claims, 15 Drawing Sheets

(52) U.S. Cl.
CPC .......... *G06F 3/1255* (2013.01); *G06F 3/1292* (2013.01); *H04N 1/00307* (2013.01); *H04N 1/00482* (2013.01); *H04N 1/00925* (2013.01); *H04N 1/32106* (2013.01); *H04N 1/32765* (2013.01); *H04N 2201/0094* (2013.01); *H04N 2201/3222* (2013.01); *H04N 2201/3271* (2013.01)

(58) Field of Classification Search
CPC ........... H04N 1/32106; H04N 1/32765; H04N 1/00925; H04N 1/00482; H04N 1/00307
USPC ........................................................ 358/1.15
See application file for complete search history.

(56) References Cited

U.S. PATENT DOCUMENTS

| | | | | |
|---|---|---|---|---|
| 2009/0103124 | A1* | 4/2009 | Kimura | G06F 3/1204 358/1.15 |
| 2010/0069008 | A1* | 3/2010 | Oshima | H04W 4/02 455/41.3 |
| 2010/0321718 | A1* | 12/2010 | Mihira | H04N 1/00212 358/1.14 |
| 2012/0069380 | A1 | 3/2012 | Sugimoto | |
| 2012/0212771 | A1 | 8/2012 | Goddard et al. | |

FOREIGN PATENT DOCUMENTS

| | | |
|---|---|---|
| JP | 2008-186241 A | 8/2008 |
| JP | 2010-098717 A | 4/2010 |
| JP | 2012-194703 A | 10/2012 |
| JP | 2013-003846 A | 1/2013 |

\* cited by examiner

COMMUNICATION DEVICE, AND METHOD AND COMPUTER READABLE MEDIUM FOR THE SAME

CROSS-REFERENCE TO RELATED APPLICATION

This application is a continuation of U.S. patent application Ser. No. 14/200,143 filed Mar. 7, 2014 which claims priority under 35 U.S.C. §119 from Japanese Patent Application No. 2013-045317 filed on Mar. 7, 2013. The entire subject matter of the applications is incorporated herein by reference.

BACKGROUND

Technical Field

The following description relates to one or more techniques to cause a communication device to transmit, to an image processing apparatus, a print instruction to print images.

Related Art

Recently, a plurality of wireless communication systems have been applied to communication between a communication device (such as a smartphone and a tablet computer) and an image processing apparatus. The wireless communication systems may include Bluetooth® (trademark registered by BLUETOOTH SIG, INC.), Wi-Fi® (trademark registered by Wi-Fi Alliance), and Near Field Communication (hereinafter, which may be referred to as NFC). Further, an image processing technique has been developed, in which image data is transmitted via wireless communication from the communication device to the image processing apparatus, so as to allow the image processing apparatus to perform image processing.

SUMMARY

In the aforementioned technique, setting values for the image processing to be applied to the image data are transmitted along with the image data, from the communication device to the image processing apparatus. Then, the image processing apparatus performs the image processing in accordance with the setting values received from the communication device. Specifically, for instance, the setting values for the image processing of the image data may include setting values for a printing operation such as a sheet size and a print color, and may include setting values for a scanning operation such as a resolution. The setting values for the image processing, which are set by the communication device, might not comply with image processing capability and/or processing specifications of the image processing apparatus. Therefore, the image processing apparatus might be caused to perform image processing not complying with its processing capability.

Specifically, for instance, it might not be possible to make a selection between color printing and monochrome printing at the side of the communication device. In other words, the communication device might have limited configurable ranges of the setting values for the printing operation that so as not to accept the setting of color printing. In this case, even though the image processing apparatus has a color printing function, the image processing apparatus might receive, from the communication device, a print instruction to perform monochrome printing. In other words, the image processing apparatus might be caused to perform the printing operation without exerting enough of its processing (printing) capability.

Aspects of the present invention are advantageous to present one or more improved techniques to restrict a communication device from issuing an image processing instruction to cause an image processing apparatus to perform image processing not complying with image processing capability of the image processing apparatus.

According to aspects of the present invention, a communication device is provided, which includes a communication unit, a storage unit, and a processor configured to, when executing processor-executable instructions stored in the storage unit, perform determining a first configurable range including setting values stored in the storage unit, acquiring, from an image processing apparatus via the communication unit, a second configurable range including setting values for image processing executable by the image processing apparatus, determining whether the first configurable range is equal to the second configurable range, when determining that the first configurable range is equal to the second configurable range, transmitting an image processing instruction to perform an image processing operation according to the setting values of the first configurable range stored in the storage unit, to the image processing apparatus via the communication unit, and when determining that the first configurable range is different from the second configurable range, restricting transmission of the image processing instruction to the image processing apparatus.

According to aspects of the present invention, further provided is a method configured to be implemented on a processor connected with a communication unit and a storage unit, the method including determining a first configurable range including setting values stored in the storage unit, acquiring, from an image processing apparatus via the communication unit, a second configurable range including setting values for image processing executable by the image processing apparatus, determining whether the first configurable range is equal to the second configurable range, when determining that the first configurable range is equal to the second configurable range, transmitting an image processing instruction to perform an image processing operation according to the setting values of the first configurable range stored in the storage unit, to the image processing apparatus via the communication unit, and when determining that the first configurable range is different from the second configurable range, restricting transmission of the image processing instruction to the image processing apparatus.

According to aspects of the present invention, further provided is a non-transitory computer-readable storage medium storing computer-readable instructions configured to, when executed by a processor connected with a communication unit and a storage unit, cause the processor to perform determining a first configurable range including setting values stored in the storage unit, acquiring, from an image processing apparatus via the communication unit, a second configurable range including setting values for image processing executable by the image processing apparatus, determining whether the first configurable range is equal to the second configurable range, when determining that the first configurable range is equal to the second configurable range, transmitting an image processing instruction to perform an image processing operation according to the setting values of the first configurable range stored in the storage unit, to the image processing apparatus via the communication unit, and when determining that the first configurable range is different from the second configurable range, restricting transmission of the image processing instruction to the image processing apparatus.

BRIEF DESCRIPTION OF THE ACCOMPANYING DRAWINGS

FIG. 1 is a block diagram of a communication system in a first embodiment according to one or more aspects of the present invention.

FIG. 2 exemplifies a display mode to display an image on a panel of a mobile phone in the first embodiment according to one or more aspects of the present invention.

FIGS. 3A and 3B exemplify display modes to display screens for configuring print settings on the panel of the mobile phone in the first embodiment according to one or more aspects of the present invention.

FIG. 4 exemplifies a display mode to display an image on the panel of the mobile phone in the first embodiment according to one or more aspects of the present invention.

FIGS. 5 to 8 are flowcharts showing a procedure of a process to be executed by the mobile phone to select a printer and configure print settings complying with print specifications of the selected printer in the first embodiment according to one or more aspects of the present invention.

FIGS. 9 to 12 are flowcharts showing a procedure of a process to be executed by the mobile phone to cause a multi-function peripheral (hereinafter, which may be referred to as MFP) to perform a printing operation based on comparison between print specifications of the selected printer and print specifications of the MFP in the first embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompanying drawings.

First Embodiment

Configuration of Communication System

Figure 1:
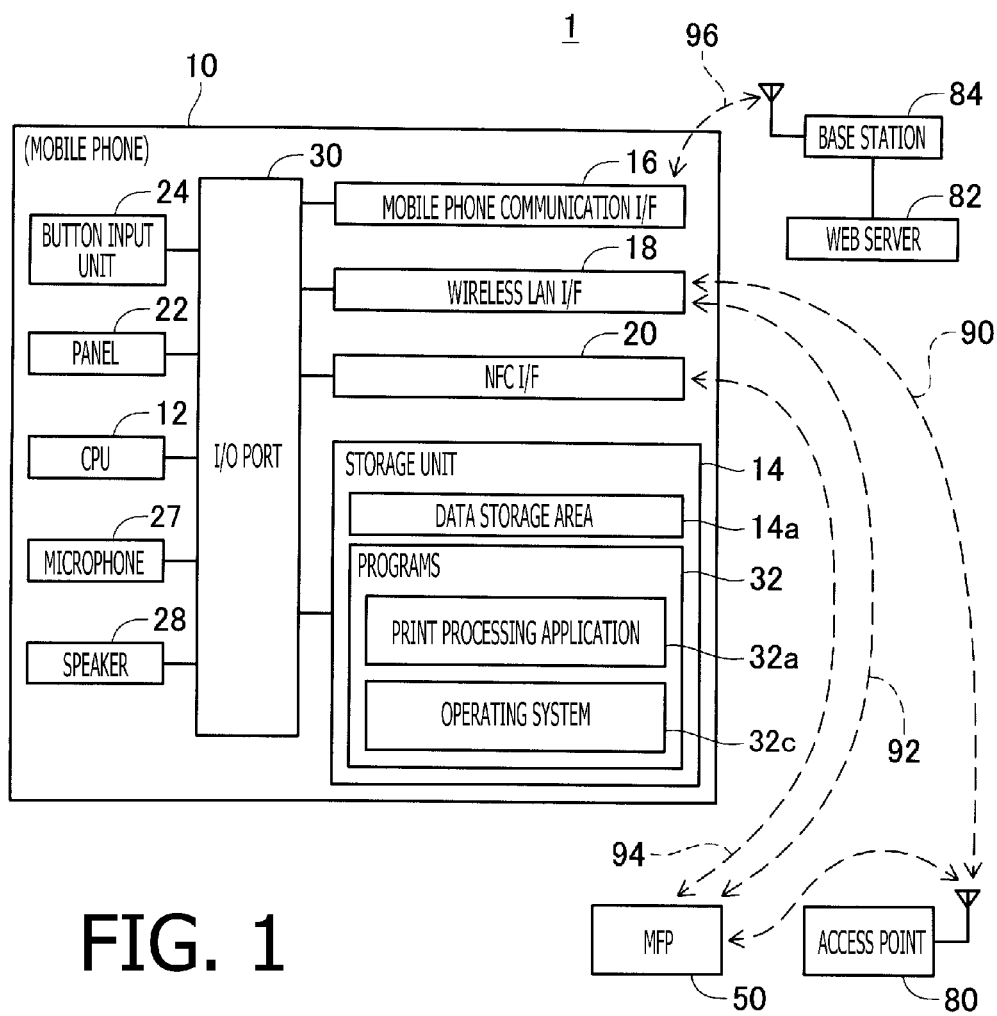

As shown in FIG. 1, a communication system 1 of the embodiment includes a mobile phone 10, a multi-function peripheral (hereinafter, which may be referred to as MFP) 50, an access point 80, a web server 82, and a base station 84. Each of the mobile phone 10 and the MFP 50 is configured to serve as a wireless LAN terminal device. Further, the MFP 50 is configured to have a plurality of functions such as a printing function, a scanning function, a copy function, and a facsimile function. The access point 80 is configured to serve as a wireless LAN access point. The web server 82 is configured to provide, via a network, a client device with a function and data owned by the web server 82.

A configuration of the mobile phone 10 will be described. The mobile phone 10 includes a central processing unit (hereinafter, which may be referred to as CPU) 12, a storage unit 14, a mobile phone communication interface (hereinafter, which may be referred to as I/F) 16, a wireless LAN interface (I/F) 18, an NFC interface (I/F) 20, a panel 22, a button input unit 24, a microphone 27, and a speaker 28. These elements 12, 14, 16, 18, 20, 22, 24, 27, and 28 are configured to communicate with each other via an input-output port 30.

The wireless LAN I/F 18 is configured to perform Wi-Fi (hereinafter, which may be referred to as WF) wireless communication 90 based on a communication standard IEEE 802.11 or an equivalent standard. Namely, the mobile phone 10 is configured to perform data communication with the MFP 50 via the access point 80 when accessing the access point 80 so as to be allowed to perform the WF wireless communication 90. It is noted that, in this disclosure, the terms "information" and "data" are defined as follows. The term "information" is used as a higher-level broader concept than the term "data." Therefore, for instance, "A data" may be replaced with (translated into) "A information." Further, "B data" replicated or converted from "A data" may be replaced with (translated into) "A information" as far as "B data" is referred to with the same meaning as "A data."

Further, the wireless LAN I/F 18 is configured to perform Wi-Fi Direct (hereinafter, which may be referred to as WFD) wireless communication 92 based on the communication standard IEEE 802.11 or an equivalent standard. Namely, the mobile phone 10 is configured to perform direct data communication with the MFP 50 when accessing an access point of the MFP 50 so as to be allowed to perform the WFD wireless communication 92.

The NFC I/F 20 is configured to perform NFC wireless communication 94 based on international standards of ISO/IEC21481 or ISO/IEC18092. Namely, the mobile phone 10 is configured to perform direct data communication with the MFP 50 when put into a state of the NFC wireless communication 94 being available. In this respect, nonetheless, the NFC wireless communication 94 has a shorter communicable distance and a lower communication speed than the WF wireless communication 90 and the WFD wireless communication 92.

The mobile phone communication I/F 16 is configured to perform mobile phone wireless communication 96 with the base station 84. Namely, the mobile phone 10 is configured to perform data communication with the web server 82 via the base station 84 when put into a state of the mobile phone wireless communication 96 being available.

The CPU 12 is configured to carry out processes in accordance with programs 32 stored in the storage unit 14. Hereinafter, the CPU 12 executing a program (such as a print processing application 32a) may be simply referred to as a program name of the program. For instance, "the print processing application 32a" may represent "the CPU 12 that executes the print processing application 32a." It is noted that the storage unit 14 may include a combination of a random access memory (hereinafter, which may be referred to as RAM), a read only memory (hereinafter, which may be referred to as ROM), a flash memory, a hard disk drive (hereinafter, which may be referred to as HDD), and a buffer of the CPU 12.

The storage unit 14 is configured to store the programs 32, which contain the print processing application 32a and an operating system (hereinafter, which may be referred to as OS) 32c. The print processing application 32a is configured to cause the CPU 12 to carry out a process for controlling the MFP 50 to print images expressed by image data stored in a data storage area 14a. For instance, the OS 32b may be actualized by an Android OS.

The OS 32c is a program configured to provide a basic function to be used by the print processing application 32a. The OS 32c contains programs for performing the wireless communications 90, 92, 94, and 96 via the wireless LAN I/F 18, the NFC I/F 20, and the mobile phone communication I/F 16, and programs for controlling the storage unit 14, the panel 22, and the button input unit 24.

Further, the storage unit 14 includes the data storage area 14a, which is configured to store a plurality of pieces of photograph data and document data. The print processing application 32a is configured to acquire data from the storage unit 14 via the OS 32c.

The panel 22 includes a display screen configured to display various functions of the mobile phone 10. The print processing application 32a is configured to output image data and cause the panel 22 to display an image based on the image data via the OS 32c. The button input unit 24 includes a touch sensor, and is integrated with the panel 22. Thus, the button input unit 24 is configured to detect an input medium close to or in contact with the panel 22, and accept a user's button operation. The print processing application 32a is configured to acquire, via the OS 32c, data indicating what button operation has been performed by the user.

<Operations of Mobile Phone>

An explanation will be provided about operations of the mobile phone 10 in the first embodiment. The mobile phone 10 is configured to, when executing the print processing application 32a, easily cause a printer to print one or more images. Specifically, the mobile phone 10 is configured to detect printers connectable therewith via the WF wireless communication 90, and select an intended one of the detected printers so as to cause the selected printer to perform printing. Thereby, even though the mobile phone 10 is not directly connected with the intended printer, or even when the user wishes to use the intended printer on the go, it is possible to cause the intended printer to perform printing via the mobile phone 10. Further, in order to prevent the need for preparation of an application for each of different types of printers, the mobile phone 10 is configured to receive information on specifications from a printer connectable therewith via the WF wireless communication 90, and limit configurable ranges of setting values for the printer in accordance with the specifications. Therefore, no matter what type the selected printer is of, it is possible to prevent the mobile phone 10 from issuing a print instruction to cause the printer to perform printing in accordance with inappropriate settings. Further, in order to avoid troublesome operations to configure the settings, the mobile phone 10 is configured to store, in the storage unit 14, information on an IP address and setting values for a printer previously selected, and read out the information stored in the storage unit 14 when causing the panel 22 to display an image, and cause the previously selected printer to perform printing according to previous settings, e.g., in response to a print button being operated. Thus, by execution of the print processing application 32a on the mobile phone 10, it is possible to easily issue a print instruction to cause the previously selected printer to perform printing, from the mobile phone 10 via a wireless LAN. It is noted that, when the IP address and the setting values for the previously selected printer are stored in a non-volatile memory such as the flash memory and the HDD of the storage unit 14, even though the mobile phone 10 is once powered off and then powered on, it is possible to cause the previously selected printer to perform printing according to the previous settings.

Further, by displaying an image on the panel 22 and bringing the mobile phone 10 close to the MFP 50, it is possible to easily cause the MFP 50 to perform printing according to the previous settings via the NFC wireless communication 94, even without any entry from the user. However, the type of the previously selected printer might not be identical to the type of the MFP 50, and therefore, the setting values read out from the storage unit 14 might not be appropriate to a printing operation by the MFP 50. Further, when the user attempts to change the setting values stored in the storage unit 14 before bringing the mobile phone 10 close to the MFP 50, setting values configurable on the mobile phone 10 might be limited depending on the specifications of the previously selected printer. In this case, the user could not change the setting values to values appropriate to the printing operation by the MFP 50. In view of such a problem, the following operations may be executed by the mobile phone 10.

<Print Instruction from Print Instruction Screen>

Figure 2:
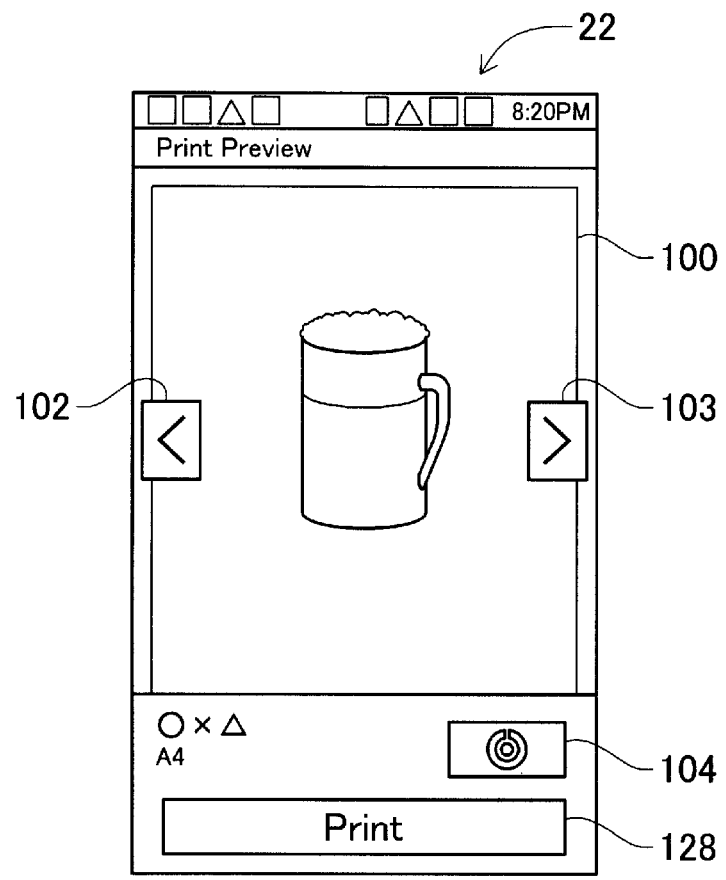

Specifically, when the print processing application 32a is launched on the mobile phone 10, the panel 22 displays thereon a screen for prompting the user to make a selection between photograph printing and document printing. Then, when the user selects one of the photograph printing and the document printing, one of images to be printed is displayed on the panel 22. Namely, as shown in FIG. 2, an image 100 based on image data stored in the data storage area 14a is displayed on the panel 22. When the panel 22 displays thereon the screen shown in FIG. 2, the print processing application 32a acquires, via the OS 32c, various kinds of information (such as a the a printer name, an IP address, setting values, and specification information) set with respect to a printer previously selected by the print processing application 32, if the various kinds of information are stored in the storage unit 14.

The panel 22 displays thereon a back button 102 and a forward button 103 on both sides of the image 100 in a lateral direction. The back button 102 and the forward button 103 are configured to, when operated, sequentially switch from the currently displayed image 100 to another image. Namely, by operating the back button 102 and the forward button 103, the user is allowed to display an intended image 100 on the panel 22.

Figure 3A:
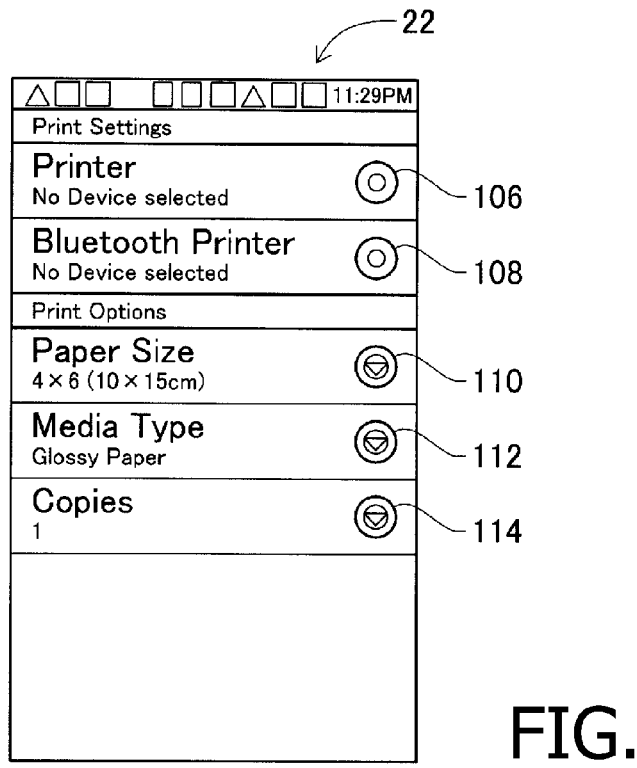

There is displayed on the panel 22, a menu button 104 below the image 100. The menu button 104 is configured to, when operated, switch the display screen on the panel 22 from the screen for displaying the image 100 to another screen for configuring print settings as shown in FIG. 3A.

Further, there is displayed on the panel 22, a print button 128 below the image 100. The print button 128 is configured to, when operated, cause the selected printer to print the image 100 being displayed on the panel 22. The selected printer is one of the previously selected printer and the printer selected this time on the screen shown in FIG. 3A that is specified by the information acquired (by the print processing application 32a) when the panel 22 displays thereon the screen shown in FIG. 2. The mobile phone 10 transmits image data of the image selected by the user (i.e., the image 100 being displayed on the panel 22) to the selected printer via WF wireless communication or WFD wireless communication.

<Print Instruction Via NFC>

Further, the mobile phone 10 is configured to cause the MFP 50 to print an intended image when brought close to the MFP 50 without the print button 128 being operated. Specifically, when the user brings the mobile phone 10 close to the MFP 50 so as to place the mobile phone 10 within a communicable distance for the NFC wireless communication 94 from the MFP 50, the NFC wireless communication 94 is established between the mobile phone 10 and the MFP 50. When the NFC wireless communication 94 is established, connection information for establishing the WF wireless communication 90 or WFD wireless communication 92 is transmitted between the mobile phone 10 and the MFP 50 via the NFC wireless communication 94. Then, according to the connection information, the WF wireless communication 90 or the WFD wireless communication 92 is established. Thus, the process to establish the WF wireless communication 90 or the WFD wireless communication 92 using the NFC wireless communication 94 is referred to as a handover process. The mobile phone 10 transmits the image data of the image selected by the user (i.e., the image 100 being displayed on the panel 22) to the MFP 50 via the WF wireless communication 90 or the WFD wireless communication 92.

The mobile phone 10 transmits the image data of the selected image 100 to the selected printer or the MFP 50 via WF wireless communication or WFD wireless communication. At this time, the mobile phone 10 transmits various kinds of data containing a print instruction to print the selected image 100 and setting values configured on the mobile phone 10 as well as the image data of the selected image 100. Thereby, the printer or the MFP 50 that has received the various kinds of data performs a printing operation of printing the selected image 100 in accordance with the setting values configured on the mobile phone 10. The setting values configured on the mobile phone 10 are either the previously configured setting values or the setting values configured this time on the screen shown in FIG. 3A that are specified by the information acquired (by the print processing application 32a) when the panel 22 displays thereon the screen shown in FIG. 2.

A reason why the WF wireless communication 90 or the WFD wireless communication 92 is established after the establishment of the NFC wireless communication 94 is as follows. Since the WF wireless communication 90 and the WFD wireless communication 92 are able to achieve higher-speed data communication than the WFD wireless communication 92, it is preferable to transmit the image data via the WF wireless communication 90 or the WFD wireless communication 92.

<Print Setting Screen>

When the menu button 104 is operated, the screen on the panel 22 for displaying the image 100 is switched to the screen for configuring the print settings as shown in FIG. 3A. On the screen for configuring the print settings, there are displayed printer selecting buttons 106 and 108 for selecting a printer to be caused to print the selected image 100, and print setting buttons 110, 112, and 114 for configuring setting values for the printing operation.

Specifically, the setting values (print options) for the printing operation contain information for selecting (determining) values for setting items related to the printing operation (i.e., information for determining what kind of printing operation the selected printer is to perform). The setting items related to the printing operation include a size of printing sheets, a type of the printing sheets, the number of print copies, single-side printing/double-side printing, and color printing/monochrome printing (hereinafter, which item may be referred to as "print color"). The setting values are not limited to numerical values but may be flags or character strings. It is noted that FIG. 3A shows, as examples of elements for selecting the setting values (print options), a size setting button 110 for setting the size of printing sheets (Paper Size), a sheet setting button 112 for setting the type of printing sheets (Media Type), and a number setting button 114 for setting the number of print copies (Copies).

When the printer name and the IP address have been acquired (by the print processing application 32a) at the time of display of the screen shown in FIG. 2 on the panel 22, the printer name and the IP address are displayed beside the printer selecting buttons 106 and 108. Meanwhile, when as the printer name and the IP address have not been acquired at the time of display of the screen shown in FIG. 2 on the panel 22, messages informing that there is no printer (device) selected are displayed beside the printer selecting buttons 106 and 108, as shown in FIG. 3A. When a printer is newly selected on a screen shown in FIG. 3B, a printer name and an IP address of the newly selected printer are displayed on the screen shown in FIG. 3A.

When the setting values have been acquired (by the print processing application 32a) at the time of display of the screen shown in FIG. 2 on the panel 22, the setting values are displayed along with the names of the setting items, beside the setting buttons 110, 112, and 114, respectively, as shown in FIG. 3A. When the setting values are updated by user's operations, new setting values are acquired and displayed on the screen shown in FIG. 3A.

<Limitation of Configurable Ranges of Setting Values>

Configurable ranges of setting values, after pressing the setting buttons 110, 112, and 114, are limited based on the specification information acquired at the time of display of the screen shown in FIG. 2 on the panel 22, until a printer is newly selected. When a printer is newly selected, the configurable ranges of the setting values are limited based on specification information acquired at that time. It is noted that limitation of the configurable ranges of the setting values will be described in detail later.

When the print processing application 32a has not acquired the setting values at the time of display of the screen shown in FIG. 2 on the panel 22, the print processing application 32a acquires default setting values previously programmed. The default setting values are determined by a vender as setting values that would be regularly set by the user. In addition, the default setting values are determined by the vender as setting values that would comply with any printer having standard specifications. Based on an assumption that the setting values that would be set by the user differ between photograph printing and document printing, different default setting values are set between photograph printing and document printing. For instance, the default setting values for the photograph printing may include a sheet size of "L-size," "color printing," and "glossy paper." The default setting values for the document printing may include a sheet size of "A4-size," "monochrome printing," and "regular paper."

Figure 3B:
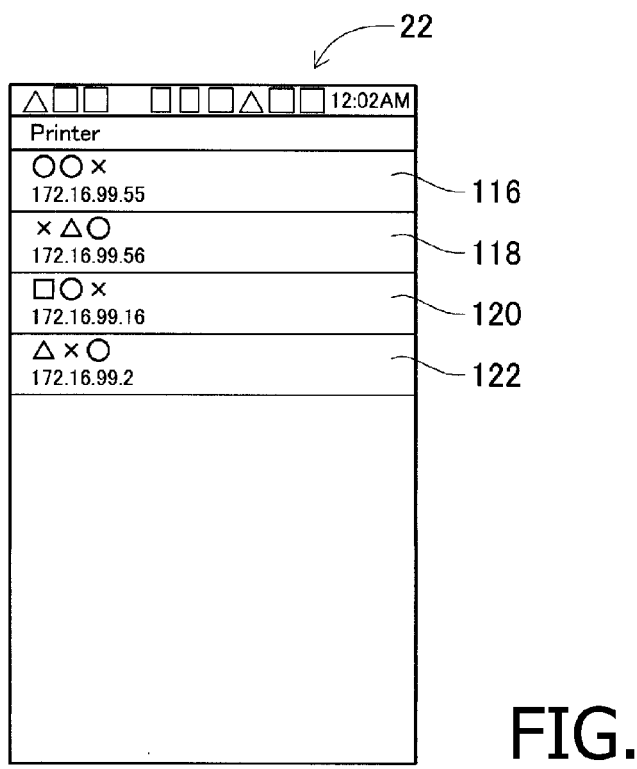

When the printer selecting buttons 106 and 108 are operated, as shown in FIG. 3B, the panel 22 displays thereon a screen for selecting a printer. On the screen for selecting a printer, buttons 116, 118, 120, and 122 are displayed on each of which a name of a corresponding printer is shown. The user is allowed to select an intended printer by operating one of the buttons 116, 118, 120, and 122 corresponding to the intended printer.

Each of four printers, corresponding to the buttons 116, 118, 120, and 122 displayed on the screen shown in FIG. 3B, establishes WF wireless communication or WFD wireless communication with the mobile phone 10. Namely, data communication is available between the mobile phone 10 and each of the four printers corresponding to the buttons 116, 118, 120, and 122.

Specifically, when the printer selecting buttons 106 and 108 are operated, the print processing application 32a causes the wireless LAN I/F 18 to broadcast a request for a printer name and an IP address to each of the printers with which the mobile phone 10 establishes the WF wireless communication 90 or the WFD wireless communication 92, and acquires printer names and IP addresses received from the printers via the wireless LAN I/F 18. The acquired printer names and IP addresses are displayed in association with the buttons 116, 118, 120, and 122.

When one of the buttons 116, 118, 120, and 122 is operated, the print processing application 32a causes the wireless LAN I/F 18 to transmit a request for information on print specifications via data communication using the IP address of a printer corresponding to the operated one of the buttons 116, 118, 120, and 122, and acquires information on the print specifications of the printer received from the printer via the wireless LAN I/F 18.

Specifically, the information on the print specifications of the printer may include specification information that directly indicates the print specifications of the printer, and/or a model name of the printer. When the printer is able to transmit the specification information, the print processing application 32a acquires the specification information of the printer. Meanwhile, when the printer is not able to transmit the specification information, the print processing application 32a is not allowed to acquire the specification information of the printer, but acquires the model name of the printer. It is noted that the print processing application 32a may acquire model information from a printer that is able to transmit specification information.

When acquiring a model name from a printer that is not able to transmit specification information, the print processing application 32a acquires specification information previously programmed in association with the acquired model name.

To setting items for which specifications (values) of the printer are not shown based on the acquired specification information, default specification information previously programmed in the print processing application 32a is applied.

The default specification information is determined by the vender as specification information that would conform to standard specifications of a printer for photograph printing, and as specification information that would conform to standard specifications of a printer for document printing.

For instance, the default specification information for photograph printing may include options such as printable sheet sizes as follows: L-size, 2L-size, postcard-size, A5-size, B5-size, letter-size, and A4-size, available print colors as follows: monochrome printing and color printing, and printable sheet types as follows: regular paper, inkjet printing paper, and glossy paper. The default specification information for document printing may include options such as printable sheet sizes as follows: A6-size, B6-size, A5-size, B5-size, letter-size, A4-size, legal-size, B4-size, and A3-size, available print colors as follows: monochrome printing and color printing, and printable sheet types as follows: regular paper only.

Specifically, when the specification information acquired from the printer indicates printable sheet sizes, but does not indicate printable sheet types, the print processing application 32a acquires default specification information that indicates printable sheet types for photograph printing such as regular paper, inkjet printing paper, and glossy paper, and printable sheet types for document printing such as regular paper only.

At a time when completing acquiring the specification information as described above, the print processing application 32a stores the acquired specification information into the storage unit 14.

The four printers corresponding to the buttons 116, 118, 120, and 122 may include a printer having different printing capabilities, i.e., different print specifications from those of the other printers. Specifically, for instance, the printer corresponding to the button 116 may have the following printable sheet sizes: L-size, 2L-size, postcard-size, A5-size, B5-size, letter-size, and A4-size. Meanwhile, the printer corresponding to the button 118 may have the following printable sheet sizes: L-size, 2L-size, postcard-size, A6-size, A5-size, B6-size, B5-size, letter-size, A4-size, legal-size, B4-size, and A3-size. Further, for instance, the printer corresponding to the button 120 may have a color printing function. Meanwhile, the printer corresponding to the button 118 may not have a color printing function. Moreover, for instance, the printer corresponding to the button 120 may be configured to perform printing on inkjet printing papers and glossy papers. Meanwhile, the printer corresponding to the button 118 may not be configured to perform printing on inkjet printing papers or glossy papers.

Therefore, when one of the buttons 116, 118, 120, and 122 is operated, the configurable ranges of the setting values on the mobile phone 10 are limited depending on the print specifications of the printer corresponding to the operated button, i.e., depending on the print specifications of the printer selected by the user. Hereinafter, the printer selected by the user may be simply referred to as the selected printer. It is noted that, when the selected printer is not specified (i.e., when the user does not select a printer), the configurable ranges of the setting values on the mobile phone 10 are limited based on the default specification information.

Limitation of the configurable ranges of the setting values will be described. Specifically, for instance, in the printer corresponding to the button 116, the maximum printable sheet size is A4-size, and the minimum printable sheet size is L-size. Namely, the printer corresponding to the button 116 is not configured to perform printing on a sheet having a size larger than A4-size or smaller than L-size. Therefore, when the printer corresponding to the button 116 is selected, sizes larger than A4-size or smaller than L-size are excluded from setting values configurable by operating the size setting button 110. Hereinafter, setting values excluded from the configurable setting values may be referred to as excluded setting values. Namely, buttons for selecting the sizes larger than A4-size or smaller than L-size are not displayed on the panel 22, and therefore, it is not possible to select setting values corresponding to the sizes larger than A4-size or smaller than L-size. Meanwhile, buttons for selecting sizes equal to or smaller than A4-size and equal to or larger than L-size are displayed on the panel 22, and therefore, it is possible to select setting values corresponding to the sizes equal to or smaller than A4-size and equal to or larger than L-size. Thereby, the setting values configurable by operating the size setting button 110 (i.e., the configurable range of the sheet size for the printer corresponding to the button 116) range from a setting value for setting L-size (hereinafter, which may be simply referred to as an "L-size setting value") to a setting value for setting A4-size (hereinafter, which may be simply referred to as an "A4-size setting value"). More specifically, the configurable range of the sheet size for the printer corresponding to the button 116 is a range including L-size, 2L-size, postcard-size, A5-size, B5-size, letter-size, and A4-size.

Further, for instance, the printer corresponding to the button 120 has a color printing function, and is configured to perform printing on glossy papers. Namely, the printer corresponding to the button 120 allows the user to make a selection between color printing and monochrome printing and to make a selection between printing on glossy papers and printing on regular papers. Therefore, when the printer corresponding to the button 120 is selected, a setting button (not shown) for making a selection between color printing and monochrome printing and a setting button (not shown) for making a selection between printing on glossy papers and printing on regular papers are additionally displayed below the buttons 110, 112, and 114. Thereby, it is possible to configure settings for the printer corresponding to the button 120 such as a setting for making a selection between color printing and monochrome printing, and a setting for making a selection between printing on glossy papers and printing on regular papers. It is noted that setting values configurable by the setting button for making a selection between color printing and monochrome printing (i.e., setting values of print color) include a setting value for setting color printing (hereinafter, which may be referred to as a color printing setting value) and a setting value for setting monochrome printing (hereinafter, which may be referred to as a monochrome printing setting value). Further, setting values configurable by the setting button for making a selection between printing on glossy papers and printing on regular papers (i.e., setting values of sheet type) include a setting value for setting printing on glossy papers (hereinafter, which may be referred to as a glossy-paper printing setting value) and a setting value for setting printing on regular papers (hereinafter, which may be referred to as a regular-paper printing setting value). In other words, a configurable range of available print colors is a range including the color printing setting value and the monochrome printing setting value. Further, a configurable range of printable sheet types is a range including the glossy-paper printing setting value and the regular-paper printing setting value.

Meanwhile, the printer corresponding to the button 118 is configured to not perform color printing but perform monochrome printing. Therefore, when the printer corresponding to the button 118 is selected, the panel 22 does not display thereon the setting button for making a selection between color printing and monochrome printing. Namely, the user is not allowed to configure a setting value for the setting item "print color."

It is noted that, when it is not possible to configure a setting value for a setting item, the print processing application 32a acquires, as a setting value for the setting item, a setting value based on the information on the print specifications acquired from the printer. Namely, in the case of the printer corresponding to the button 118, the print processing application 32a acquires "monochrome printing" as a setting value for the setting item "print color." In this case, "color printing" is an excluded setting value. In this respect, however, when the printer is configured to perform printing according to the aforementioned default setting values, the print processing application 32a may acquire a default setting value as a setting value for the setting item.

Further, when at least one of the current setting values is not within a configurable range for the corresponding setting item, that is, when at least one of the current setting values is an excluded setting value, the print processing application 32a acquires, as a setting value for the corresponding setting item, a setting value based on the information on the print specifications acquired from the printer. Namely, when a current setting value for the setting item "print color" is "color printing," and the printer corresponding to the button 118 is selected, the print processing application 32a acquires "monochrome printing" as a setting value for print color. In this respect, however, when the selected printer is configured to perform printing according to the default setting values, the default setting value for print color may be applied as a current setting value for print color.

Thus, the print processing application 32a is configured to use at least setting values according to which the selected printer is allowed to perform printing, of current setting values that have already been acquired when the printer is selected.

As described above, the specification information is stored in the storage unit 14. Therefore, as long as the selected printer is not updated, the configurable ranges of the setting values on the mobile phone 10 are limited depending on the print specifications of the selected printer. Namely, for instance, when the printer corresponding to the button 116 is selected, as long as the printer is not reselected, the sizes larger than A4-size or smaller than L-size are excluded from the range of the setting values for the sheet size configurable by operating the size setting button 110.

When the panel 22 displays thereon the screen for configuring the print settings, the user configures the print settings by operating the panel 22 and selecting an intended setting value from among the configurable setting values for each setting item depending on the print specifications of the selected printer. Specifically, when one of the print setting buttons 110, 112, and 114 is operated on the screen for configuring the print settings (see FIG. 3A), the panel 22 displays thereon a detail setting screen (not shown) for selecting an intended setting value from among configurable setting values within the configurable range limited depending on the print specifications of the selected printer for a setting item corresponding to the operated button. The user operates the panel 22 and selects a button corresponding to an intended setting value from among selectable buttons displayed on the detail setting screen in association with the configurable setting values. When a return button (not shown) is operated on the screen for configuring the print settings, it is determined that the print setting process is completed, and the setting values are stored into the storage unit 14. More specifically, with respect to each setting item for which a setting value is newly selected after display of the screens shown in FIGS. 2 and 3A, the selected setting value is stored. Meanwhile, for the other setting item(s), the setting values acquired from the storage unit 14 at the time of display of the screen shown in FIG. 2 are stored.

Figure 4:
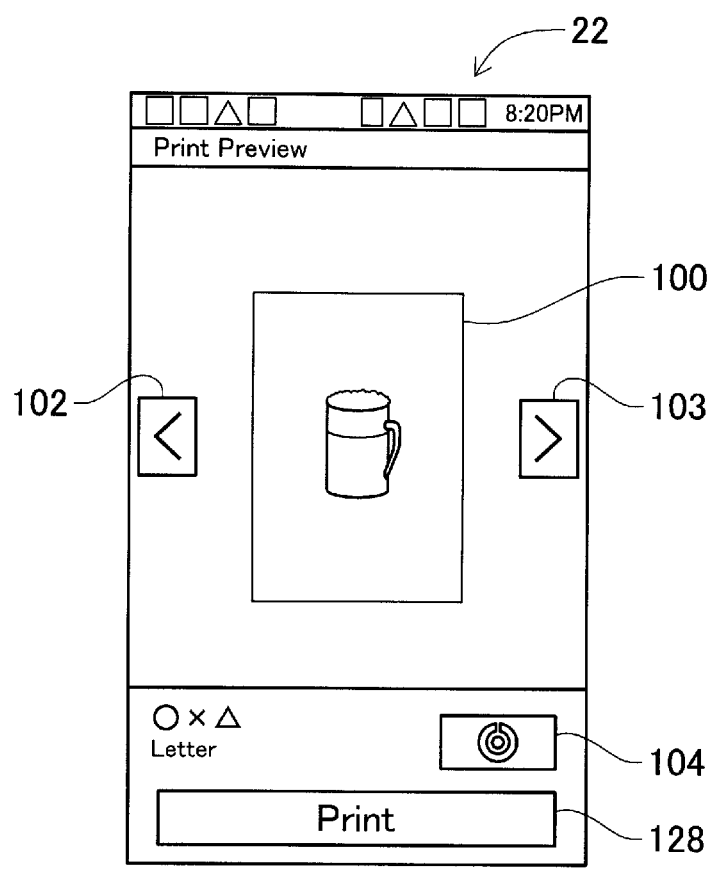
Figure 5:
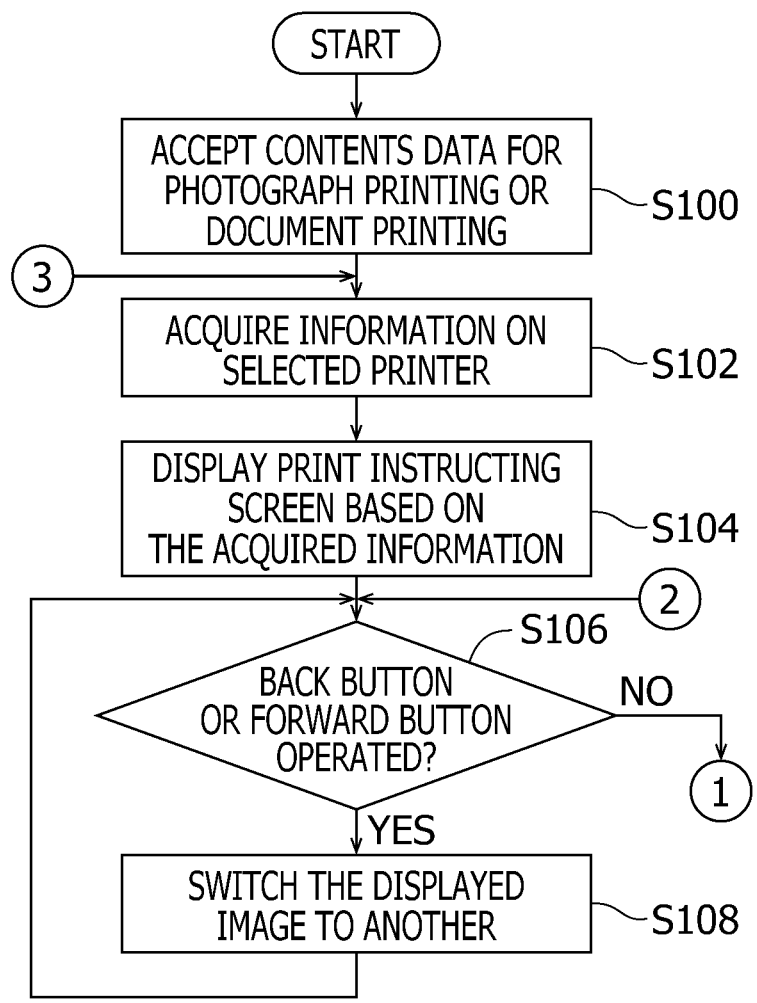
Figure 6:
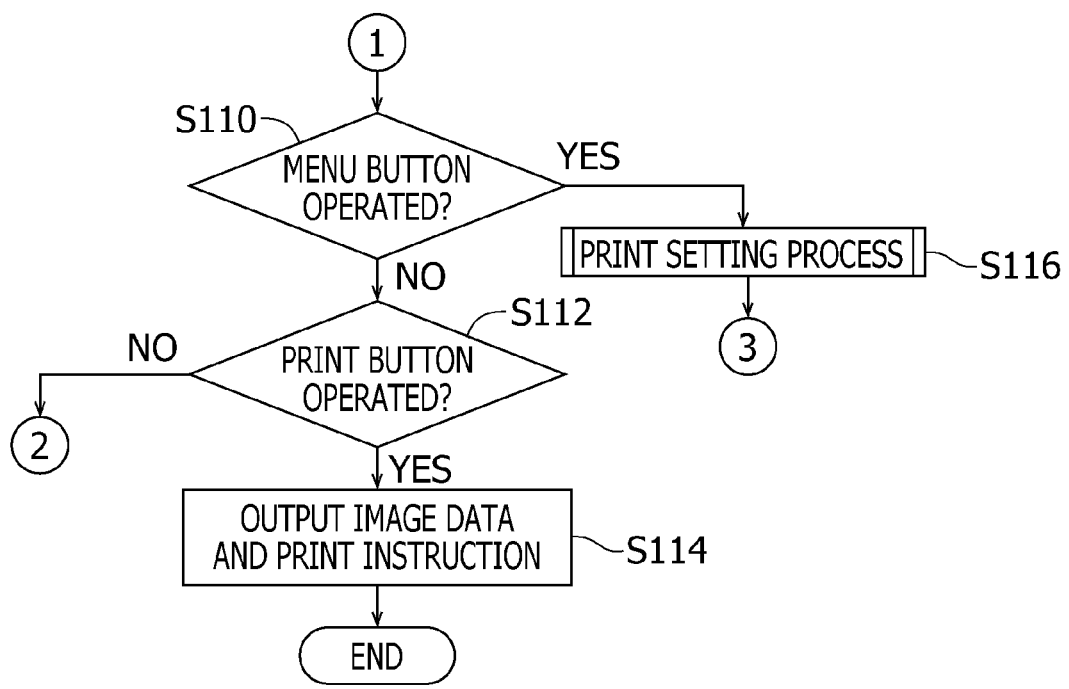
Figure 7:
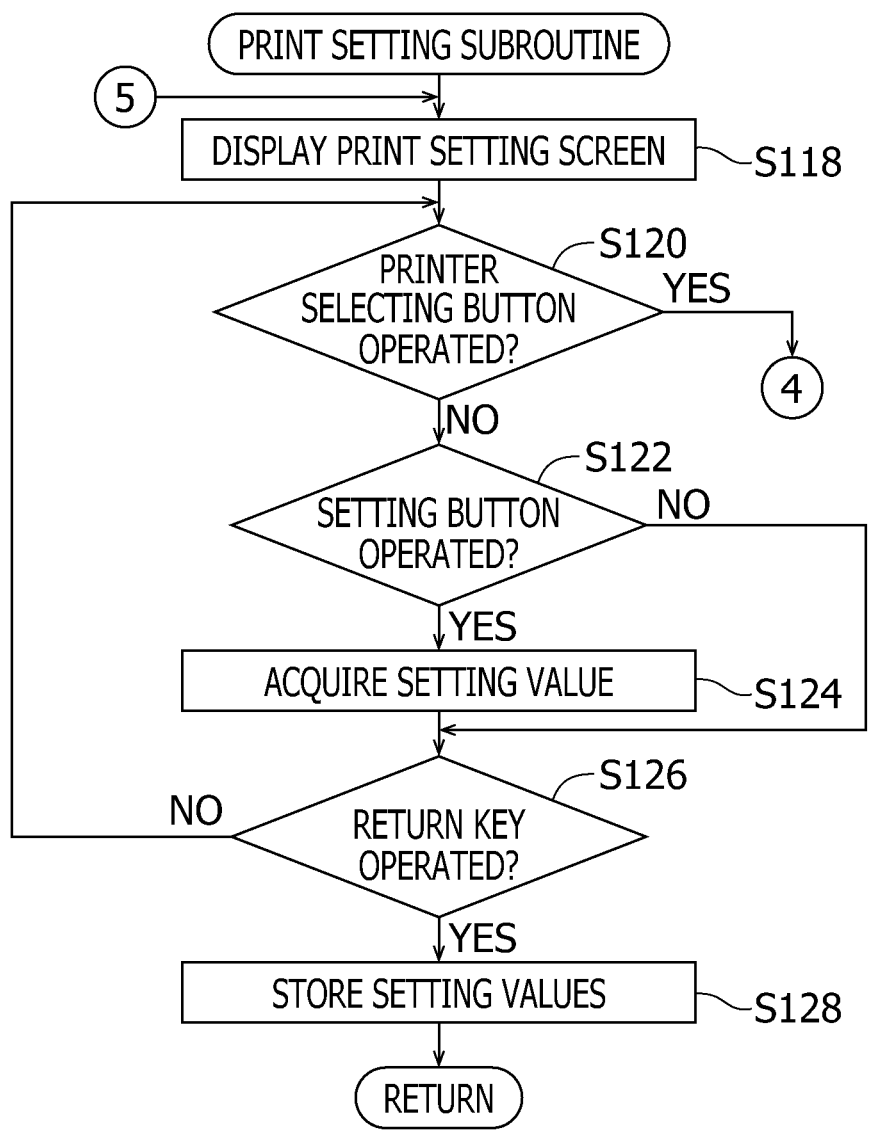
Figure 8:
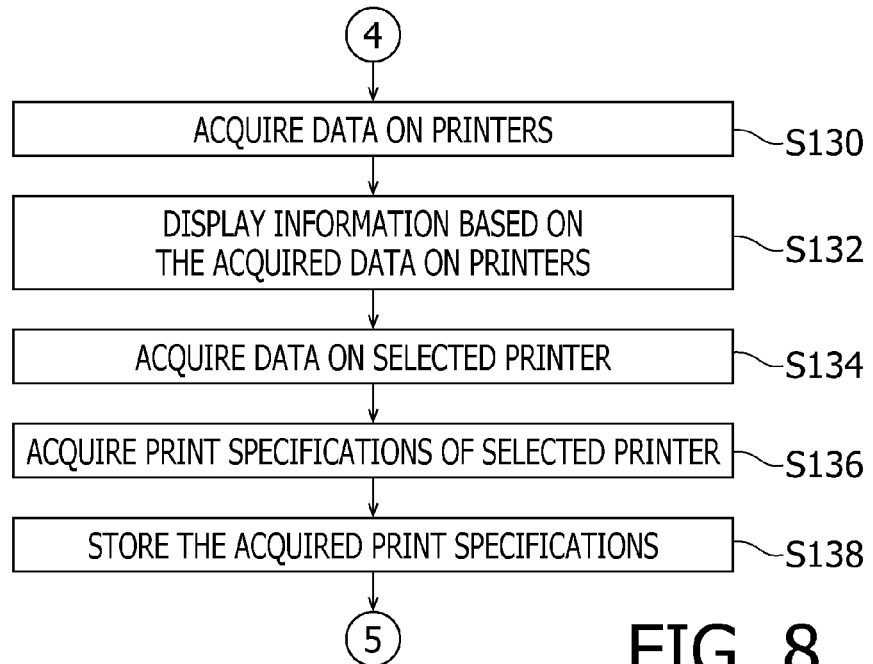

When the return button (not shown) is operated, and the setting values are stored into the storage unit 14, the panel 22 displays therein an image 100 shown in FIG. 4. It is noted that the image 100 is displayed in a display mode depending on the print settings. Specifically, when the print settings are configured that includes "letter-size" as a setting value for the sheet size, the image 100 is displayed with a size corresponding to the letter-size, as shown in FIG. 4. Further, on a side of the menu button 104 in the lateral direction, displayed are the name of the selected printer and a setting value of the print settings (e.g., the sheet size as configured). Thereby, it is possible to confirm what the selected printer is and what the configured setting value is. It is noted that, in the case of FIG. 2, "A4-size" is configured as a setting value for the sheet size, and the image 100 is displayed with a size corresponding to the A4-size.

<Print Instructing Process Via NFC in View of Limited Configurable Range>

An explanation will be provided about operations to cause the MFP 50 to print an intended image by bringing the mobile phone 10 close to the MFP 50. As described above, the print settings configured on the mobile phone 10 are set depending on the print specifications of the selected printer. Therefore, when the print specifications of the MFP 50 are equivalent to the print specifications of the selected printer, it is possible to perform printing without having to provide entries for selecting setting values after bringing the mobile phone 10 close to the MFP 50. However, when the print specifications of the MFP 50 are not equivalent to the print specifications of the selected printer, there might be a case where performed is a printing operation not complying with the printing capability of the MFP 50 because of differences between the print specifications of the MFP 50 and the print specifications of the selected printer. For instance, the MFP 50 might be caused to perform a printing operation without exerting enough of its printing capability.

Specifically, for instance, when the printer corresponding to the button 118 is selected, the user is not allowed to make a selection between color printing and monochrome printing. In this case, "monochrome printing" is set as a setting value for the setting item "print color." Therefore, for instance, there might be a case where a print instruction with monochrome printing as a setting value for print color is transmitted to the MFP 50 having the color printing function and the monochrome printing function. In this case, even though the MFP 50 has the color printing function, the MFP 50 might be caused to perform monochrome printing of a photograph image. Thus, the MFP 50 might be caused to perform a printing operation without exerting enough of its printing capability.

In view of the above problem, the mobile phone 10 of the first embodiment is configured to make a comparison between the print specifications of the MFP 50 and the print specifications of the selected printer, and perform a printing operation based on a result of the comparison. Specifically, the mobile phone 10 acquires, from the MFP 50, information on the print specifications of the MFP 50.

The mobile phone 10 acquires the information on the print specifications of the MFP 50 via the WFD wireless communication 92 or the WF wireless communication 90. More specifically, the mobile phone 10 transmits an instruction to transmit the information on the print specifications of the MFP 50, to the MFP 50 via the WFD wireless communication 92 or the WF wireless communication 90. Then, in response to receipt of the instruction, the MFP 50 transmits the information on the print specifications of the MFP 50, to the mobile phone 10 via the WFD wireless communication 92 or the WF wireless communication 90. Thereby, the mobile phone 10 acquires the information on the print specifications of the MFP 50. It is noted that a configurable range for the setting item "sheet size" based on the print specifications of the MFP 50 is from "postcard-size" to "A4-size." Further, a configurable range for the setting item "print color" based on the print specifications of the MFP 50 includes "color printing" and "monochrome printing."

Further, the mobile phone 10 acquires information on the print specifications of the selected printer from the storage unit 14. Specifically, for instance, when the printer corresponding to the button 118 is set as a selected printer, a configurable range for the setting item "sheet size" is from "business-card-size" to "A3-size," and a configurable range for the setting item "print color" is "monochrome printing."

When acquiring the information on the print specifications of the MFP 50 and the information on the print specifications of the selected printer, the mobile phone 10 determines whether a configurable range (MFP configurable range) for each setting item of the MFP 50 is broader or narrower than a configurable range (selected-printer configurable range) for each setting item of the selected printer, based on the information on the print specifications of the MFP 50 and the information on the print specifications of the selected printer.

When the selected-printer configurable range is broader than the MFP configurable range (i.e., when the MFP configurable range is different from and included in the selected-printer configurable range), setting values within the selected-printer configurable range contain all setting values within the MFP configurable range, and at least one setting value out of the MFP configurable range. Meanwhile, when the MFP configurable range is broader than the selected-printer configurable range (i.e., when the selected-printer configurable range is different from and included in the MFP configurable range), the setting values within the MFP configurable range contain all the setting values within the selected-printer configurable range, and at least one setting value out of the selected-printer configurable range. Furthermore, when the setting values within the selected-printer configurable range are equivalent to the setting values within the MFP configurable range, the selected-printer configurable range is equal to the MFP configurable range.

As described above, when the selected-printer configurable range is narrower than the MFP configurable range (i.e., when the selected-printer configurable range is different from and included in the MFP configurable range), the setting values based on the information on the print specifications of the MFP 50 contain at least one setting value different from the setting values based on the information on the print specifications of the selected printer. Therefore, it may not be possible to configure, on the mobile phone 10, settings for a printing operation executable by the MFP 50. Specifically, for instance, when the printer corresponding to the button 118 is set as a selected printer, it is not possible to make a selection between monochrome printing and color printing. Meanwhile, the MFP 50 has a color printing function. In this case, the MFP 50 might not be allowed to perform a printing operation with enough of its printing capability.

In view of the above problem, according to the mobile phone 10 of the first embodiment, when the selected-printer configurable range is narrower than the MFP configurable range (i.e., when the selected-printer configurable range is different from and included in the MFP configurable range), the panel 22 displays thereon a setting button (not shown) for configuring a setting value that is within the MFP configurable range but not within the selected-printer configurable range. Specifically, for instance, when the selected printer is not configured to allow the user to make a selection between color printing and monochrome printing, but the MFP 50 is configured to allow the user to make a selection between color printing and monochrome printing, a setting button for the setting item "print color" is additionally displayed on the screen for configuring the print settings shown in FIG. 3A.

Thus, by the additional display of the setting button for "print color," the user is provided with an opportunity to configure the print settings again with a print instruction being once restricted from being issued. In other words, the user is allowed to realize that output of a print instruction is restricted, in response to the additional display of the setting button for "print color." Then, it becomes possible to configure "color printing" as a setting value for the setting item "print color" on the mobile phone 10. Thereby, a print instruction to perform color printing is transmitted from the mobile phone 10 to the MFP 50. Thus, the user is allowed to configure the print settings complying with the print specifications of the MFP 50, and to cause the MFP 50 to perform a printing operation with enough of its printing capability.

Further, when the newly displayed setting button is not operated, it is possible to assume that the user wishes to carry out a printing operation based on the current setting values. In other words, it is possible to assume that the user is willing to accept a printing operation based on the current setting values. Therefore, when the newly displayed setting button is not operated, a print instruction to perform a printing operation in accordance with the current setting values is transmitted from the mobile phone 10 to the MFP 50.

Meanwhile, when the selected-printer configurable range is broader than the MFP configurable range (i.e., when the MFP configurable range is different from and included in the selected-printer configurable range), as described above, the setting values based on the information on the print specifications of the selected printer contain at least one setting value other than the setting values based on the information on the print specifications of the MFP 50. Namely, the setting values configurable on the mobile phone 10 contain at least one setting value for a printing operation unexecutable by the MFP 50. In this case, the MFP 50 might not be allowed to perform a printing operation according to a user's intention.

Specifically, for instance, when the printer corresponding to the button 118 is set as a selected printer, the setting values configurable for the setting item "sheet size" range from "business-card-size" to "A3-size." Meanwhile, in the case of the MFP 50, the setting values configurable for "sheet size" range from "postcard-size" to "A4-size." Therefore, for instance, there might be a case where a print instruction with "A3-size" as a setting value for "sheet size" is transmitted to the MFP 50 for which the maximum printable sheet size is A4-size. In this case, the MFP 50 might not be allowed to execute a printing operation based on the received print instruction, since the MFP 50 is not able to perform printing on a sheet of A3-size. Alternatively, the MFP might be caused to perform printing of an A4-size image into which an original A3-size image is reduced, or perform printing of an A4-size image as just a part of the original A3-size image. Thus, it might not be possible to perform a printing operation according to a user's intention.

In view of the above problem, according to the mobile phone 10 of the first embodiment, when a setting value for a printing operation unexecutable by the MFP 50 is configured on the mobile phone 10, that is, when setting values actually configured on the mobile phone 10 contain a setting value other than the setting values based on the information on the print specifications of the MFP 50, the panel 22 displays thereon a message informing that the MFP 50 is not able to perform a printing operation based on the current print settings. In other words, the panel 22 displays thereon a message informing that output of a print instruction is restricted because of the current print settings containing a setting value not complying with the print specifications of the MFP 50. At this time, in the same manner as when the selected-printer configurable range is narrower than the MFP configurable range (i.e., when the selected-printer configurable range is different from and included in the MFP configurable range), the panel 22 displays thereon a setting button (not shown) for configuring a setting value out of the selected-printer configurable range. Thereby, it becomes possible to configure print settings complying with the print specifications of the MFP 50, and to perform a printing operation according to a user's intention.

Even though the selected-printer configurable range is broader than the MFP configurable range (i.e., even though the MFP configurable range is different from and included in the selected-printer configurable range), there may be a case where a printing operation is carried out without any difficulties. Specifically, there may be a case where the user configures "A4-size" as a setting value for "sheet size," though the maximum sheet size configurable on the mobile phone 10 is A3-size. In this case, since the maximum sheet size applicable to printing by the MFP 50 is A4-size, it is possible to cause the MFP 50 to perform printing on a sheet of A4-size without any difficulties. Namely, even though the selected-printer configurable range is broader than the MFP configurable range (i.e., even when the MFP configurable range is different from and included in the selected-printer configurable range), when the setting value for each setting item actually configured on the mobile phone 10 is within the MFP configurable range, the MFP 50 is allowed to print the image 100 in accordance with the print settings configured on the mobile phone 10.

<Print Application>

The aforementioned selection of a printer and configuration of setting values in conformity with the print specifications of the selected printer are implemented by the CPU 12 executing the print processing application 32a. Hereinafter, an explanation will be provided about a process to be performed by execution of the print processing application 32a, with reference to FIGS. 5 to 8.

When the mobile phone 10 is powered on, and the print processing application 32a is launched, a process according to a main flow is started. In S100 of the main flow, the CPU 12 accepts contents data for one, selected by a user operation, of photograph printing and document printing. Specifically, the CPU 12 acquires, via the OS 32c, data generated in response to acceptance of a user operation for selecting one of photograph printing and document printing on the panel 22, and acquires, via the OS 32c, contents data selected by the user operation. Then, the CPU 12 goes to S102. For instance, JPEG photograph image data may be exemplified as the contents data for photograph printing. Further, PDF document data may be exemplified as the contents data for document printing.

In S102, the CPU 12 acquires information on the selected printer. Specifically, the CPU 12 acquires, via the OS 32c, data indicating various kinds of information stored in the storage unit such as the printer name, the IP address, the setting values, and the specification information of the selected printer. Then, the CPU 12 goes to S104. In S104, the CPU 12 displays the screen (the print instructing screen)

shown in FIG. 2, based on the acquired information on the selected printer. Specifically, the CPU 12 outputs, via the OS 32a, screen data for causing the panel 22 to display the print instructing screen based on the acquired information on the selected printer. Then, the CPU 12 goes to S106.

In S106, the CPU 12 determines whether the back button 102 or the forward button 103 has been operated. Specifically, the CPU 12 determines whether the CPU 12 has acquired, via the OS 32c, data generated in response to an operation of the back button 102 or the forward button 103. When determining that the back button 102 or the forward button 103 has been operated (S106: Yes), the CPU 12 goes to S108. In S108, the CPU 12 switches the image 100 displayed on the panel 22 to another in response to the operation of the back button 102 or the forward button 103. Specifically, the CPU 12 outputs, via the OS 32c, data for causing the panel 22 to display an image 100 in response to the operation of the back button 102 or the forward button 103. Then, the CPU 12 goes back to S106. For instance, an image based on a single piece of JPEG photograph image data may be exemplified as an image 100 for photograph printing. Further, an image based on a single piece of page data of PDF document data may be exemplified as an image 100 for document printing.

Meanwhile, when determining that the back button 102 or the forward button 103 has not been operated (S106: No), the CPU 12 goes to S110. In S110, the CPU 12 determines whether the menu button 104 has been operated. Specifically, the CPU 12 determines whether the CPU 12 has acquired, via the OS 32c, data generated in response to an operation of the menu button 104. When determining that the menu button 104 has not been operated (S110: No), the CPU 12 goes to S112.

In S112, the CPU 12 determines whether the print button 128 has been operated. Specifically, the CPU 12 determines whether the CPU 12 has acquired, via the OS 32c, data generated in response to an operation of the print button 128. When determining that the print button 128 has not been operated (S112: No), the CPU 12 goes back to S106. Meanwhile, when determining that the print button 128 has been operated (S112: Yes), the CPU 12 goes to S114. In S114, the CPU 12 outputs various kinds of data such as image data of the image 100 to be printed, a print instruction to print the image 100 based on the image data, and data on the setting value configured for each setting item, so as to cause the wireless LAN I/F 18 to transmit the various kinds of data to the MFP 50 via the WF wireless communication 90 or the WFD wireless communication 92. The data on the setting value for each setting item output at this time is data on the setting value for each setting item stored in the storage unit 14 in a below-mentioned step S128. As described in the section <Limitation of Configurable Ranges of Setting Values>, the setting value for each setting item stored in the storage unit 14 in S128 is a setting value within the configurable range limited based on the print specifications of the selected printer. Then, the CPU 12 terminates the process according to the main flow.

Further, when determining in S110 that the menu button 104 has been operated (S110: Yes), the CPU 12 goes to S116. In S116, the CPU 12 performs a print setting process according to a print setting subroutine. In the print setting subroutine, in S118, the CPU 12 displays on the panel 22 a print setting screen shown in FIG. 3A. Specifically, the CPU 12 outputs, via the OS 32a, screen data for causing the panel 22 to display the print setting screen. As described in the section <Limitation of Configurable Ranges of Setting Values>, in S118, the CPU 12 outputs the screen data of the print setting screen for configuring the setting values within the configurable range (for each setting item) limited based on the print specifications of the selected printer. Then, the CPU 12 goes to S120.

In S120, the CPU 12 determines whether one of the printer selecting buttons 106 and 108 has been operated. Specifically, the CPU 12 determines whether the CPU 12 acquires, via the OS 32c, data generated in response to an operation of one of the printer selecting buttons 106 and 108. When determining that any of the printer selecting buttons 106 and 108 has not been operated (S120: No), the CPU 12 goes to S122. In S122, the CPU 12 determines whether one of the setting buttons 110, 112, and 114 has been operated. Specifically, the CPU 12 determines whether the CPU 12 has acquired, via the OS 32c, data generated in response to an operation of one of the selecting buttons 110, 112, and 114. When determining that any of the setting buttons 110, 112, and 114 has not been operated (S122: No), the CPU 12 goes to S126.

Meanwhile, when determining that one of the setting buttons 110, 112, and 114 has been operated (S122: Yes), the CPU 12 goes to S124. As described in the section <Limitation of Configurable Ranges of Setting Values>, in S124, the CPU 12 outputs the screen data for causing the panel 22 to display the detail setting screen in response to an operation of one of the setting buttons 110, 112, and 114, and the other setting button(s), and acquires a setting value configured by an operation applied onto the displayed detail setting screen. Specifically, the CPU 12 acquires, via the OS 32c, data generated in response to an operation of a button corresponding to one of configurable setting values displayed on the detail setting screen, and then acquires the corresponding setting value. Afterward, the CPU 12 goes to S126.

In S126, the CPU 12 determines whether the return key has been operated. Specifically, the CPU 12 determines whether the CPU 12 has acquires, via the OS 32c, data generated in response to an operation of the return key. When determining that the return key has not been operated (S126: No), the CPU 12 goes back to S120. Meanwhile, when determining that the return key has been operated (S126: Yes), the CPU 12 goes to S128.

In S128, the CPU 12 stores the setting values into the non-volatile memory of the storage unit 14. Specifically, the CPU 12 outputs, via the OS 32c, data for causing the non-volatile memory to store the setting values. Then, the CPU 12 terminates the print setting process (according to the print setting subroutine). Thereafter, the CPU 12 goes back to S102 of the main flow.

Further, when determining that one of the printer selecting buttons 106 and 108 has been operated (S120: Yes), the CPU 12 goes to S130. In S130, as described in the section <Limitation of Configurable Ranges of Setting Values>, the CPU 12 acquires data on each of the printers with which the mobile phone 10 establishes the WF wireless communication 90 or the WFD wireless communication 92. Specifically, the CPU 12 issues a request for data on a printer name and an IP address of each printer with which the mobile phone 10 establishes the WF wireless communication 90 or the WFD wireless communication 92, so as to cause the wireless LAN I/F 18 to transmit the request to each printer via the WF wireless communication 90. Then, when the wireless LAN I/F 18 receives data on the printer name and the IP address of each printer, the CPU 12 acquires, via the OS 32c, the data received by the wireless LAN I/F 18. Afterward, the CPU 12 goes to S132.

In S132, the CPU 12 displays, on the print setting screen, information based on the acquired data on the printer name and the IP address of each of the printers with which the mobile phone 10 establishes the WF wireless communication 90 or the WFD wireless communication 92. Specifically, the CPU 12 outputs, via the OS 32c, screen data for displaying the acquired printer name and IP address of each printer on the print setting screen. Then, the CPU 12 goes to S134.

In S134, the CPU 12 acquires data on the printer selected by the user operation. Specifically, the CPU 12 acquires, via the OS 32c, data generated by an operation of one of the buttons 116, 118, 120, and 122 to select an intended one of the printers. Then, the CPU 12 goes to S136.

In S136, the CPU 12 acquires the information on the print specifications of the selected printer. Specifically, as described in the section <Limitation of Configurable Ranges of Setting Values>, the CPU 12 issues a request for the information on the print specifications of the selected printer, so as to cause the wireless LAN I/F 18 to transmit the request to the selected printer via the WF wireless communication 90. Then, when the wireless LAN I/F 18 receives the information on the print specifications of the selected printer, the CPU 12 acquires, via the OS 32c, the data received by the wireless LAN I/F 18. Thereafter, the CPU 12 goes to S138.

In S138, the CPU 12 outputs, via the OS 32c, data for storing into the storage unit 14 the acquired information on the print specifications of the selected printer. The information on the print specifications of the selected printer, stored into the storage unit 14 in S138, is acquired in the aforementioned step S102. Then, by execution of the operations following S102, the setting values configurable on the mobile phone 10 are limited to setting values based on the information on the print specifications of the selected printer, that is, setting values within the configurable range (for each setting item) of the selected printer. Then, the CPU 12 goes back to S118.

By executing the print processing application 32a, the CPU 12 causes the MFP 50 to perform the printing operation based on the comparison between the print specifications of the selected printer and the print specifications of the MFP 50 as described in the sections <Print Instruction via NFC> and <Print Instructing Process via NFC in view of Limited Configurable Range>. Hereinafter, an explanation will be provided about a process to be performed by execution of the print processing application 32a, with reference to FIGS. 9 to 12.

When the mobile phone 10 is powered on, and the print processing application 32a is launched, a process according to a main flow is started. In S200 of the main flow, the CPU 12 determines whether the NFC wireless communication 94 is established. Specifically, when the CPU 12 has been allowed to acquire event data output from the OS 32c at the time of the establishment of the NFC wireless communication 94, the CPU determines that the NFC wireless communication 94 is established. When determining that the NFC wireless communication 94 is not established (S200: No), the CPU 12 repeatedly executes an operation of S200. Meanwhile, When determining that the NFC wireless communication 94 is established (S200: Yes), the CPU 12 performs the aforementioned handover process. Thereafter, the CPU 12 goes to S206.

Figure 10:
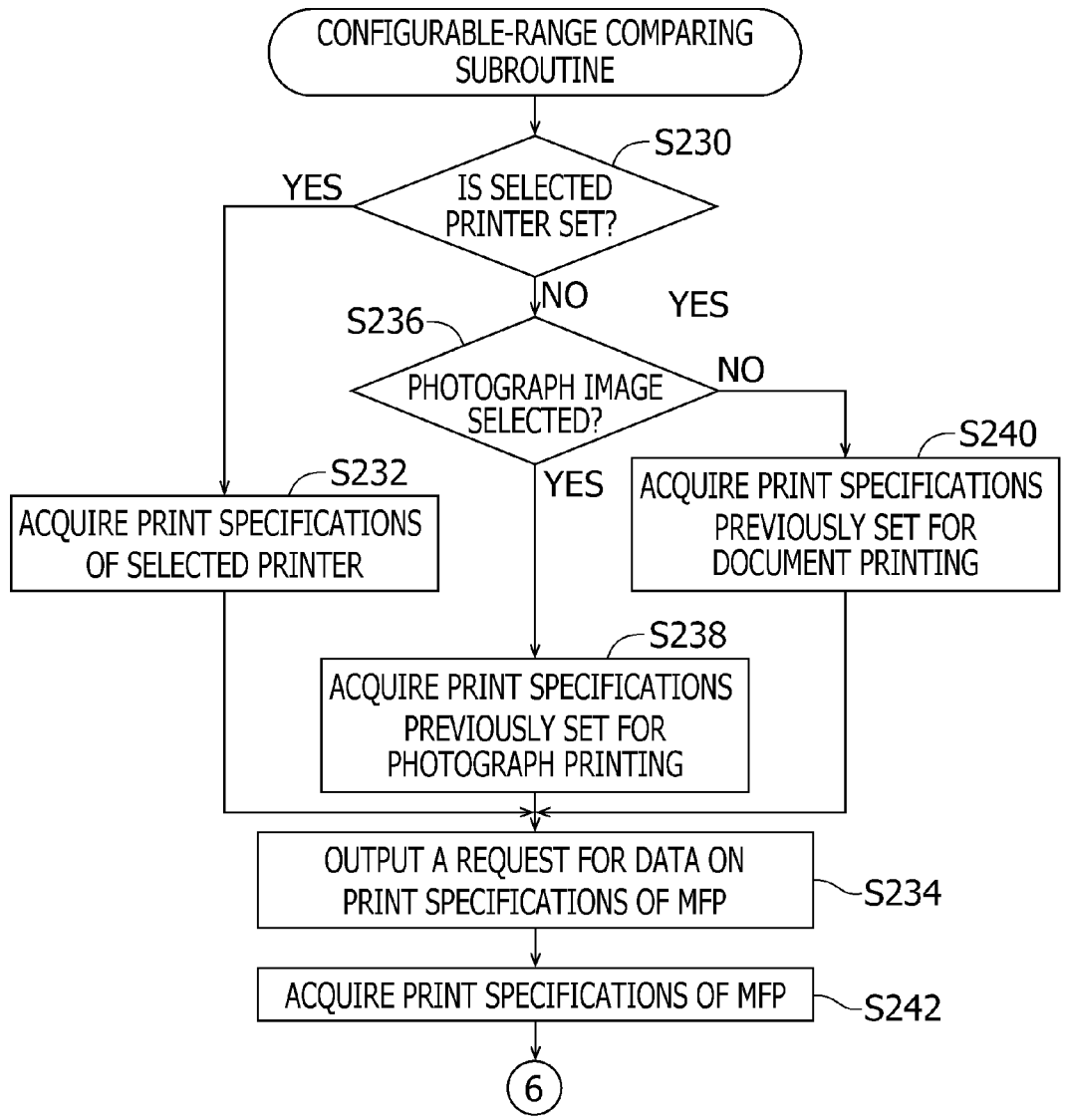
Figure 11:
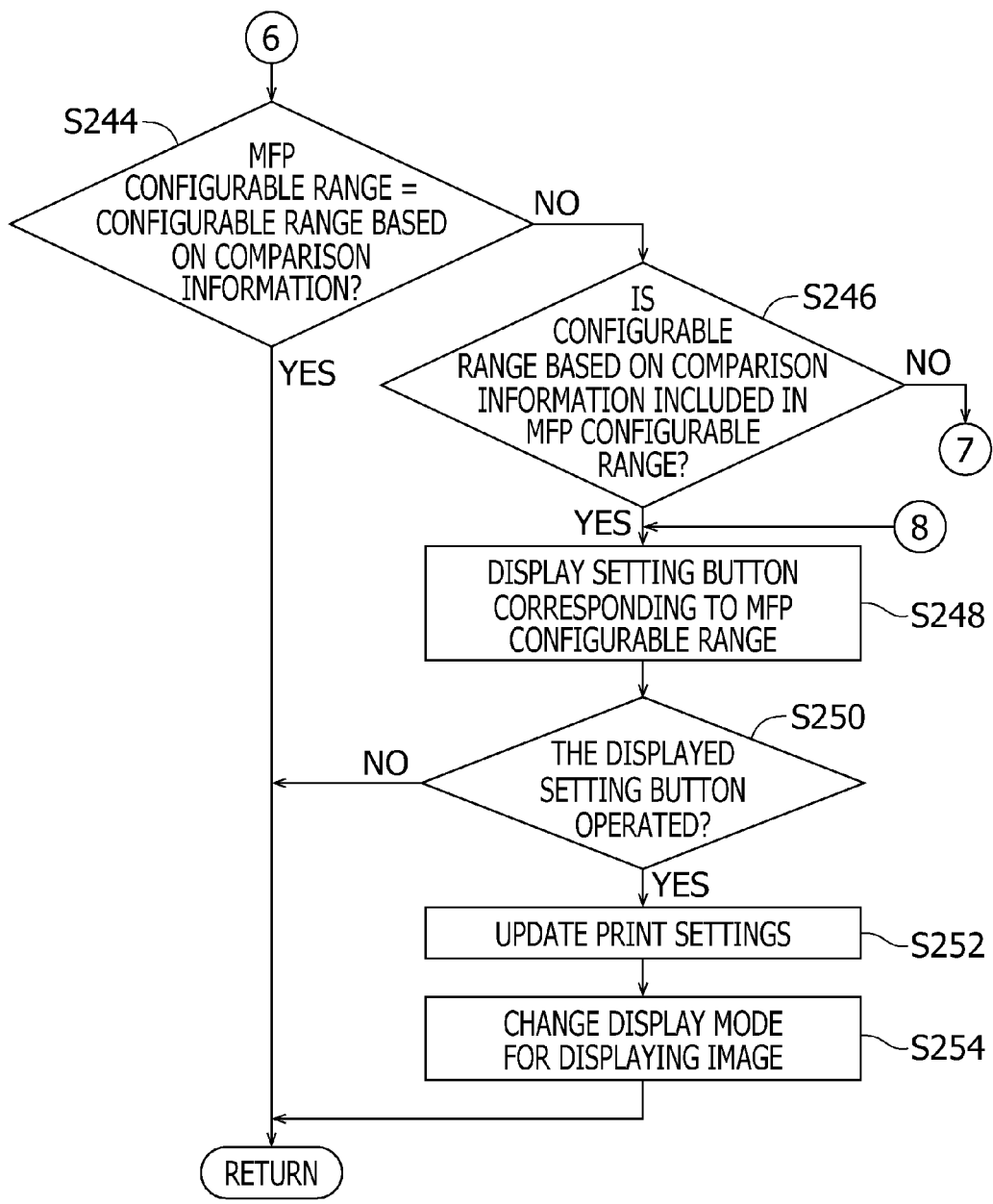
Figure 12:
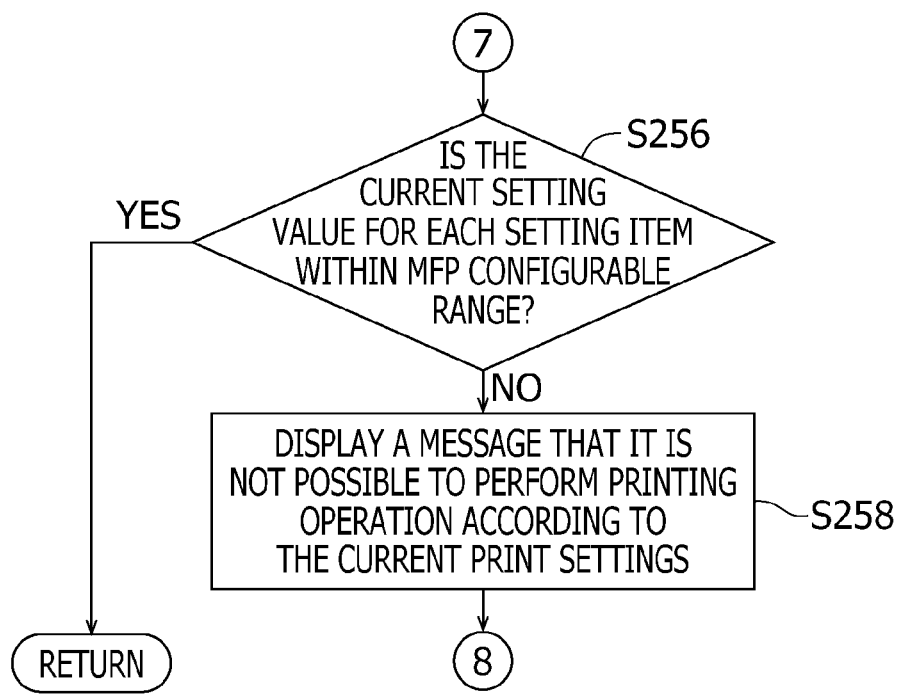

In S206, the CPU 12 performs a configurable-range comparing process according to a configurable-range comparing subroutine shown in FIGS. 10 to 12. In the configurable-range comparing subroutine, in S230, the CPU 12 determines whether a selected printer is set. Specifically, the CPU 12 determines whether information on print specifications of a selected printer is stored in the storage unit 14. It is noted that a state where "a selected printer is set" represents a state where the information on the print specifications of the selected printer has been stored into the storage unit 14 in S138. When determining that the selected printer is set (S230: Yes), the CPU 12 goes to S232. In S232, the CPU 12 acquires the print specifications of the selected printer. Specifically, the CPU 12 acquires, via the OS 32c, the information on the print specifications of the selected printer stored in the storage unit 14, as comparison information. Then, the CPU 12 goes to S234.

When determining that the selected printer is not set (S230: No), the CPU 12 goes to S236. In S236, the CPU 12 determines whether a photograph image is selected as an image to be printed. When determining that a photograph image is selected as an image to be printed (S236: Yes), the CPU 12 goes to S238. In S238, the CPU 12 acquires default setting values previously programmed for photograph printing, i.e., print specifications previously set for photograph printing, as comparison information. Then, the CPU 12 goes to S234.

Meanwhile, when determining that a document image is selected as an image to be printed (S236: No), the CPU 12 goes to S240. In S240, the CPU 12 acquires default setting values previously programmed for document printing, i.e., print specifications previously set for document printing, as comparison information. Then, the CPU 12 goes to S234.

In S234, the CPU 12 outputs, via the OS 32c, a request for data on the print specifications of the MFP 50, i.e., data on the MFP configurable range, so as to cause the wireless LAN I/F 18 to transmit the request to the MFP 50 via the WF wireless communication 90 or the WFD wireless communication 92. Then, the CPU 12 goes to S242. In S242, when the wireless LAN I/F 18 receives data on the print specifications of the MFP 50, the CPU 12 acquires, via the OS 32c, the data received by the wireless LAN I/F 18.

Then, the CPU 12 goes to S244. In S244, the CPU 12 determines whether the MFP configurable range is coincident with (is equal to) a configurable range based on the comparison information. Specifically, when the CPU 12 has acquired the information on the print specifications of the selected printer as the comparison information in S232, as described in the section <Print Instructing Process via NFC in view of Limited Configurable Range>, the CPU 12 determines whether the MFP configurable range is coincident with the selected-printer configurable range. When the CPU 12 has acquires the default print specifications as the comparison information in S238 or S240, the CPU 12 determines whether the MFP configurable range is coincident with a configurable range based on the default print specifications. A method for determining whether the MFP configurable range is coincident with the configurable range based on the default print specifications may be equivalent to the method for determining whether the MFP configurable range is equal to the selected-printer configurable range.

Specifically, when the MFP configurable range contains "color printing" and "monochrome printing" as setting values for the setting item "print color," and the configurable range based on the comparison information contains "color printing" and "monochrome printing" as setting values for "print color," the CPU 12 determines that the MFP configurable range is coincident with the configurable range based on the comparison information. Meanwhile, when the MFP configurable range contains "color printing" and "monochrome printing" as setting values for the setting item "print color," and the configurable range based on the comparison information contains "color printing" as a setting value for "print color," the CPU 12 determines that the MFP configurable range is not coincident with the configurable range based on the comparison information.

When determining that the MFP configurable range is coincident with the configurable range based on the comparison information (S244: Yes), the CPU 12 terminates the execution of the configurable-range comparing subroutine, and goes to S208 of the main flow. Meanwhile, when determining that the MFP configurable range is not coincident with the configurable range based on the comparison information (S244: No), the CPU 12 goes to S246.

In S246, the CPU 12 determines whether the configurable range based on the comparison information is narrower than the MFP configurable range (i.e., whether the configurable range based on the comparison information is included in the MFP configurable range). Specifically, when the CPU 12 has acquired the information on the print specifications of the selected printer as the comparison information in S232, as described in the section <Print Instructing Process via NFC in view of Limited Configurable Range>, the CPU 12 determines whether the selected-printer configurable range is narrower than the MFP configurable range (i.e., whether the selected-printer configurable range is included in the MFP configurable range). When the CPU 12 has acquired the default print specifications as the comparison information in S238 or S240, the CPU 12 determines whether the configurable range based on the default print specifications is narrower than the MFP configurable range (i.e., whether the configurable range based on the default print specifications is included in the MFP configurable range). A method for determining whether the configurable range based on the default print specifications is narrower than the MFP configurable range may be equivalent to the method for determining whether the selected-printer configurable range is narrower than the MFP configurable range.

Specifically, when the MFP configurable range contains "color printing" and "monochrome printing" as setting values for the setting item "print color," and the configurable range based on the comparison information contains "monochrome printing" as a setting value for "print color," the CPU 12 determines that the configurable range based on the comparison information is narrower than the MFP configurable range (i.e., the configurable range based on the comparison information is included in the MFP configurable range). Meanwhile, when the MFP configurable range contains "monochrome printing" as a setting value for "print color," and the configurable range based on the comparison information contains "color printing" and "monochrome printing" as setting values for "print color," the CPU 12 determines that the configurable range based on the comparison information is broader than the MFP configurable range (i.e., the MFP configurable range is different from and included in the configurable range based on the comparison information).

When determining that the configurable range based on the comparison information is narrower than the MFP configurable range (i.e., the configurable range based on the comparison information is included in the MFP configurable range) (S246: Yes), the CPU 12 goes to S248. In S248, as described in the section <Print Instructing Process via NFC in view of Limited Configurable Range>, the CPU 12 outputs, to the panel 22 via the OS 32c, the data for causing the panel 22 to display a setting button corresponding to the print specifications of the MFP 50. Namely, the panel 22 displays thereon a setting button for selecting a setting value that is within the MFP configurable range and out of the configurable range based on the comparison information. Specifically, when the MFP configurable range contains "color printing" and "monochrome printing" as setting values for the setting item "print color," and the configurable range based on the comparison information contains "monochrome printing" as a setting value for "print color," the panel 22 displays thereon a setting button for selecting the setting value "color printing," that is, a setting button for setting "color printing" as a setting value for the setting item "print color." Then, the CPU 12 goes to S250.

In S250, the CPU 12 determines whether the setting button displayed in S248 has been operated. Specifically, the CPU 12 determines whether the CPU 12 has acquired, via the OS 32c, data generated in response to an operation of the setting button displayed in S248. When determining that the setting button displayed in S248 has not been operated (S250: No), the CPU 12 terminates the execution of the configurable-range comparing subroutine, and goes to S208 of the main flow. It is noted that the case where the setting button displayed in S248 has not been operated may include a case where a predetermined time period has elapsed without the setting button displayed in S248 being operated after the setting button was displayed on the panel 22.

Meanwhile, when determining that the setting button displayed in S248 has been operated (S250: Yes), the CPU 12 goes to S252. In S252, the CPU 12 updates the print settings in response to the operation of the setting button. Specifically, the CPU 12 acquires, via the OS 32c, data generated in response to the operation of the setting button, and changes the setting value for the corresponding setting item based on the acquired data. Then, the CPU 12 goes to S254. In S254, the CPU 12 changes the display mode for displaying the image 100 on the panel 22, in accordance with the updated setting value for the setting item. Specifically, for instance, when the setting value for "sheet size" is changed from "A4-size" to "postcard-size," the display mode for displaying the image 100 as shown in FIG. 2 is changed to the display mode as shown in FIG. 4. Then, the CPU 12 terminates the execution of the configurable-range comparing subroutine, and goes to S208 of the main flow.

Further, when determining in S246 that the configurable range based on the comparison information is not narrower than the MFP configurable range (i.e., the configurable range based on the comparison information is not included in the MFP configurable range) (S246: No), the CPU 12 goes to S256. In S256, the CPU 12 determines whether the setting value for each setting item currently configured on the mobile phone 10 is within the MFP configurable range. Namely, as described in the section <Print Instructing Process via NFC in view of Limited Configurable Range>, the CPU 12 determines whether the setting value for each setting item stored into the storage unit 14 in S128 is within the MFP configurable range.

Specifically, when the MFP configurable range contains "color printing" and "monochrome printing" as setting values for the setting item "print color," and the setting value for "print color" currently configured on the mobile phone 10 is "monochrome printing," the MFP configurable range contains the same setting value as the setting value for "print color" currently configured on the mobile phone 10. Accordingly, in this case, the CPU 12 determines that the setting value for "print color" currently configured on the mobile phone 10 is within the MFP configurable range. Meanwhile, when the MFP configurable range contains "color printing" as a setting value for the setting item "print color," and the setting value for "print color" currently configured on the mobile phone 10 is "monochrome printing," the MFP configurable range does not contain the same setting value as the setting value for "print color" currently configured on the mobile phone 10. Accordingly, in this case, the CPU 12 determines that the setting value for "print color" currently configured on the mobile phone 10 is not within the MFP configurable range.

When determining that the setting value for each setting item currently configured on the mobile phone 10 is within the MFP configurable range (S256: Yes), the CPU 12 terminates the execution of the configurable-range comparing subroutine, and goes to S208 of the main flow.

When determining that at least one of the setting values currently configured on the mobile phone 10 is not within the MFP configurable range for the corresponding setting item (S256: No), the CPU 12 goes to S258. In S258, the CPU 12 displays, on the panel 22, a message informing that it is not possible to perform a printing operation according to the current print settings. Specifically, the CPU 12 outputs data for causing the panel 22 to display the message informing that it is not possible to perform a printing operation according to the current print settings, to the panel 22 via the OS 32c. Then, the CPU 12 goes to S248, and performs the operations of S248 and the subsequent steps. Thereby, the CPU 12 terminates the execution of the configurable-range comparing subroutine, and goes to S208 of the main flow.

In S208 of the main flow, the CPU 12 outputs the image data of the image 100 to be printed, a print instruction to print the image 100 based on the image data, and the data on the setting value for each setting item, so as to cause the wireless LAN I/F 18 to transmit the image data of the image 100 to be printed, the print instruction, and the data on the setting value for each setting item to the MFP 50 via the WF wireless communication 90 or the WFD wireless communication 92. Then, the CPU 12 terminates the process according to the main flow.

Second Embodiment

Operations of the mobile phone 10 in a second embodiment will be described. It is noted that the mobile phone 10 in the second embodiment has the same configuration as that in the first embodiment. Therefore, a detailed explanation of the configuration of the mobile phone 10 in the second embodiment will be omitted.

Figure 13:
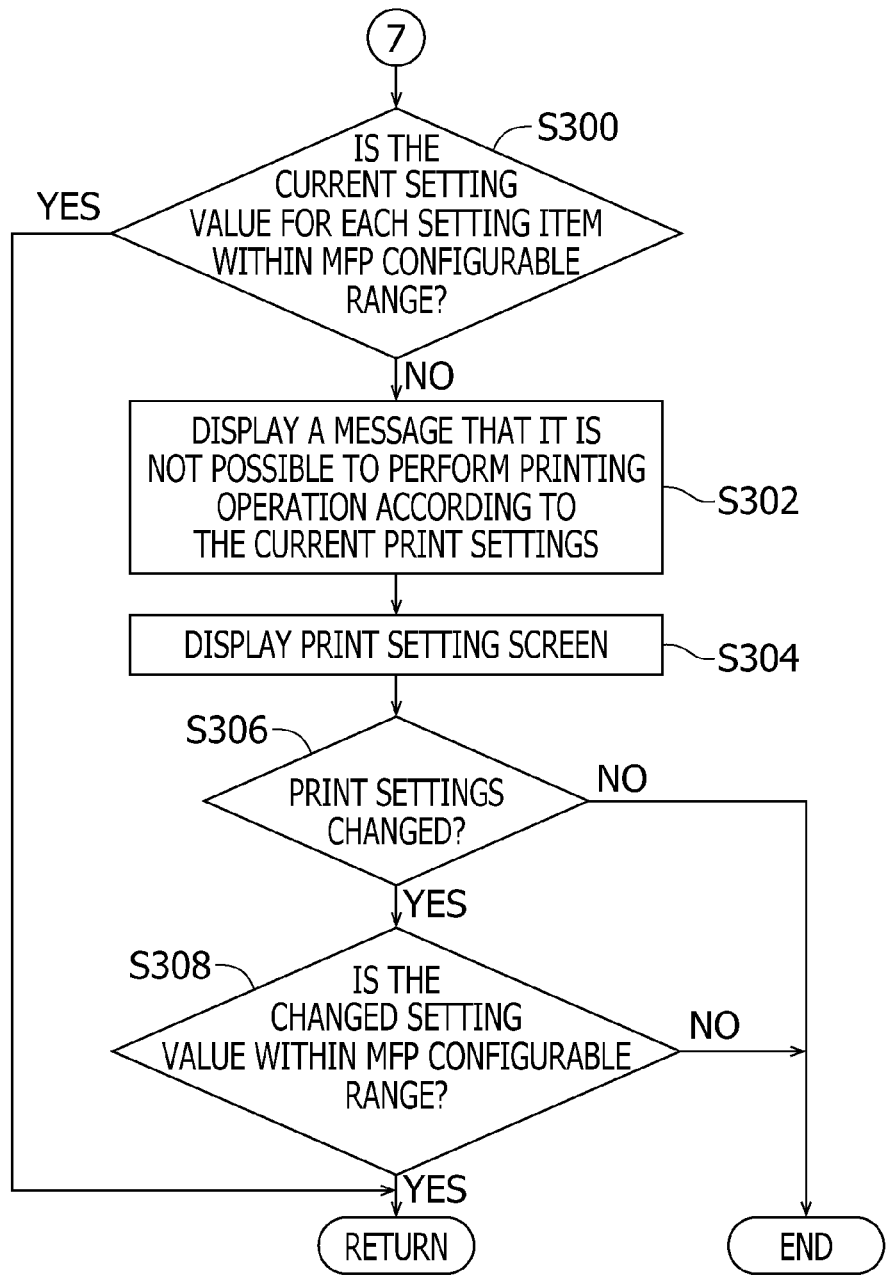
FIGS. 13 to 15 are flowcharts each showing a procedure of an alternate process of the process shown in FIG. 12 in a second embodiment according to one or more aspects of the present invention.

In the first embodiment, when at least one of the setting values currently configured on the mobile phone 10 is not within the MFP configurable range (see FIG. 12; S256: No), the panel 22 displays thereon a setting button corresponding to the MFP configurable range (see FIG. 11; S248). However, the panel 22 may display thereon the print setting screen shown in FIG. 3A. Referring to FIG. 13, an explanation will be provided about a flow (procedure) for the mobile phone causing the MFP 50 to perform a printing operation in the second embodiment. It is noted that the flow of the second embodiment is equivalent to the flow of the first embodiment shown in FIGS. 9 to 12 except for the flow shown in FIG. 12. Therefore, in the second embodiment, the flow shown in FIG. 12 is replaced with a flow shown in FIG. 13. Hence, in the following description, the flow shown in FIG. 13 will be concisely explained.

In the flow shown in FIG. 13, in S300 and S302, the CPU 12 performs the same operations as S256 and S258, respectively. Then, the CPU 12 goes to S304. In S304, the CPU 12 outputs, via the OS 32c, screen data for causing the panel 22 to display the print setting screen shown in FIG. 3A. Thereafter, the CPU 12 goes to S306. In S306, the CPU 12 determines whether the print settings have been changed. Specifically, the CPU 12 determines whether the CPU 12 has acquired, via the OS 32c, data generated in response to operations of the setting buttons 110, 112, and 114 displayed on the print setting screen.

When determining that the print settings have not been changed (S306: No), the CPU 12 terminates the execution of the configurable-range comparing subroutine, and terminates the execution of the main flow. Namely, the CPU 12 terminates the execution of the print processing application 32a. Meanwhile, when determining that the print settings have been changed (S306: Yes), the CPU 12 goes to S308.

In S308, the CPU 12 determines whether the changed setting value is within the MFP configurable range. A method for determining whether the changed setting value is within the MFP configurable range may be equivalent to the method for determining whether the setting value currently configured on the mobile phone 10 is within the MFP configurable range. When determining that the changed setting value is not within the MFP configurable range (S308: No), the CPU 12 terminates the execution of the configurable-range comparing subroutine, and terminates the execution of the main flow. Namely, the CPU 12 terminates the execution of the print processing application 32a. Meanwhile, when determining that the changed setting value is within the MFP configurable range (S308: Yes), the CPU 12 terminates the execution of the configurable-range comparing subroutine, and goes to S208 of the main flow.

Thus, when at least one of the setting values currently configured on the mobile phone 10 is not within the MFP configurable range, the user is allowed to configure one or more intended setting values via the setting buttons 110 to 114 displayed on the print setting screen, and to cause the MFP 50 to perform printing according to the intended setting values.

Figure 14:
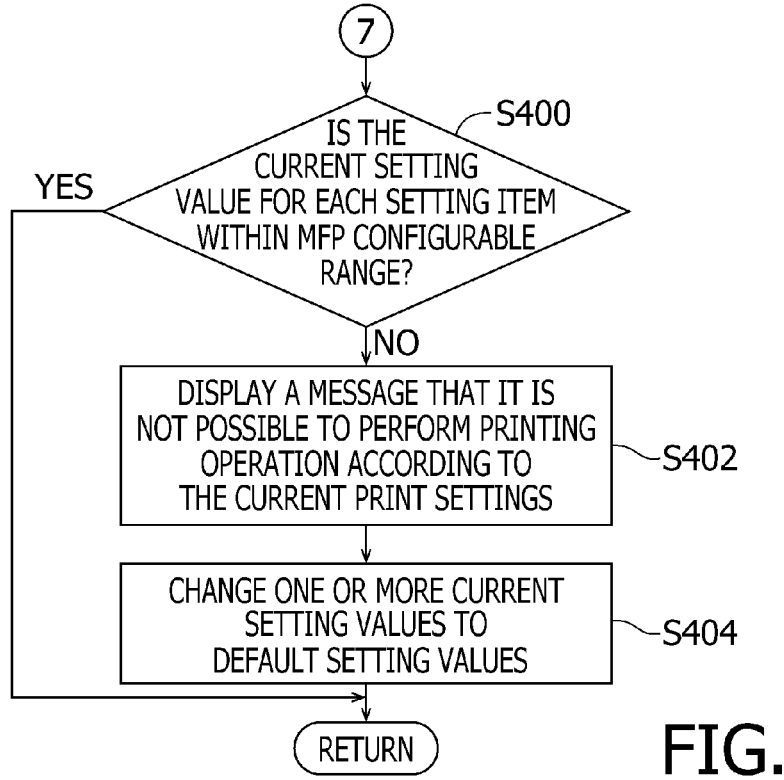

Further, when at least one of the setting values currently configured on the mobile phone 10 is not within the MFP configurable range, the at least one setting value may be automatically changed. Specifically, when at least one of the setting values currently configured on the mobile phone 10 is not within the MFP configurable range, one or more setting values (including the at least one setting value) currently configured on the mobile phone 10 may be automatically changed to corresponding default setting values as described in the first embodiment. For instance, the following exemplary case will be described based on an assumption that "A4-size," "monochrome printing," and "regular paper" are set as the default setting values. Referring to FIG. 14, an explanation will be provided about a flow (procedure) for changing one or more setting values currently configured on the mobile phone 10 to corresponding default setting values. It is noted that the flow is equivalent to the flow shown in FIGS. 9 to 12 except for the flow shown in FIG. 12. Therefore, in this exemplary case, the flow shown in FIG. 12 is replaced with a flow shown in FIG. 14. Hence, in the following description, the flow shown in FIG. 14 will be concisely explained.

In the flow shown in FIG. 14, in S400 and S402, the CPU 12 performs the same operations as those of S256 and S258 in FIG. 12, respectively. Then, the CPU 12 goes to S404. In S404, the CPU 12 changes one or more setting values currently configured on the mobile phone 10 to corresponding previously-configured default setting values. Then, the CPU 12 terminates the execution of the configurable-range comparing subroutine, and goes to S208 of the main flow.

Thus, one or more setting values currently configured on the mobile phone 10 are automatically changed to setting values configurable for the MFP 50. Thereby, the user is allowed to cause the MFP 50 to perform a printing operation without having to perform operations for re-configuring the print settings.

Figure 15:
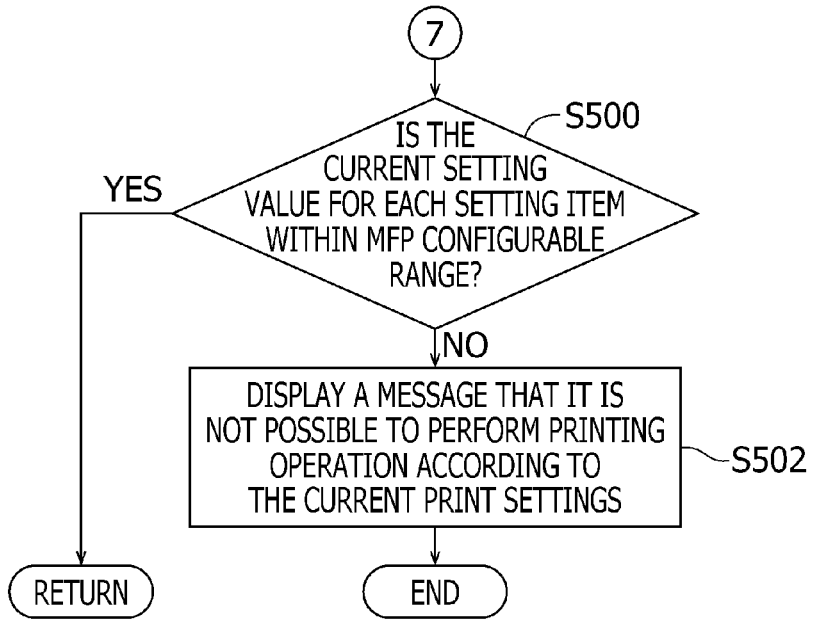

Further, when at least one of the setting values currently configured on the mobile phone 10 is not within the MFP configurable range, the CPU 12 may terminate the printing operation based on the print processing application 32a, without changing any setting value currently configured on the mobile phone 10 to the default setting value as described above. Referring to FIG. 15, an explanation will be provided about a flow for terminating the printing operation based on the print processing application 32a when at least one of the setting values currently configured on the mobile phone 10 is not within the MFP configurable range. The flow shown in FIG. 15, which is similar to the flow shown in FIG. 14, will be concisely explained.

In the flow shown in FIG. 15, in S500 and S502, the CPU 12 performs the same operations as those of S400 and S402 in FIG. 14, respectively. Then, the CPU 12 terminates the execution of the configurable-range comparing subroutine, and terminates the execution of the main flow.

Third Embodiment

Operations of the mobile phone 10 in a third embodiment will be described. It is noted that the mobile phone 10 in the third embodiment has the same configuration as that in the first embodiment. Therefore, a detailed explanation of the configuration of the mobile phone 10 in the third embodiment will be omitted.

Figure 16:
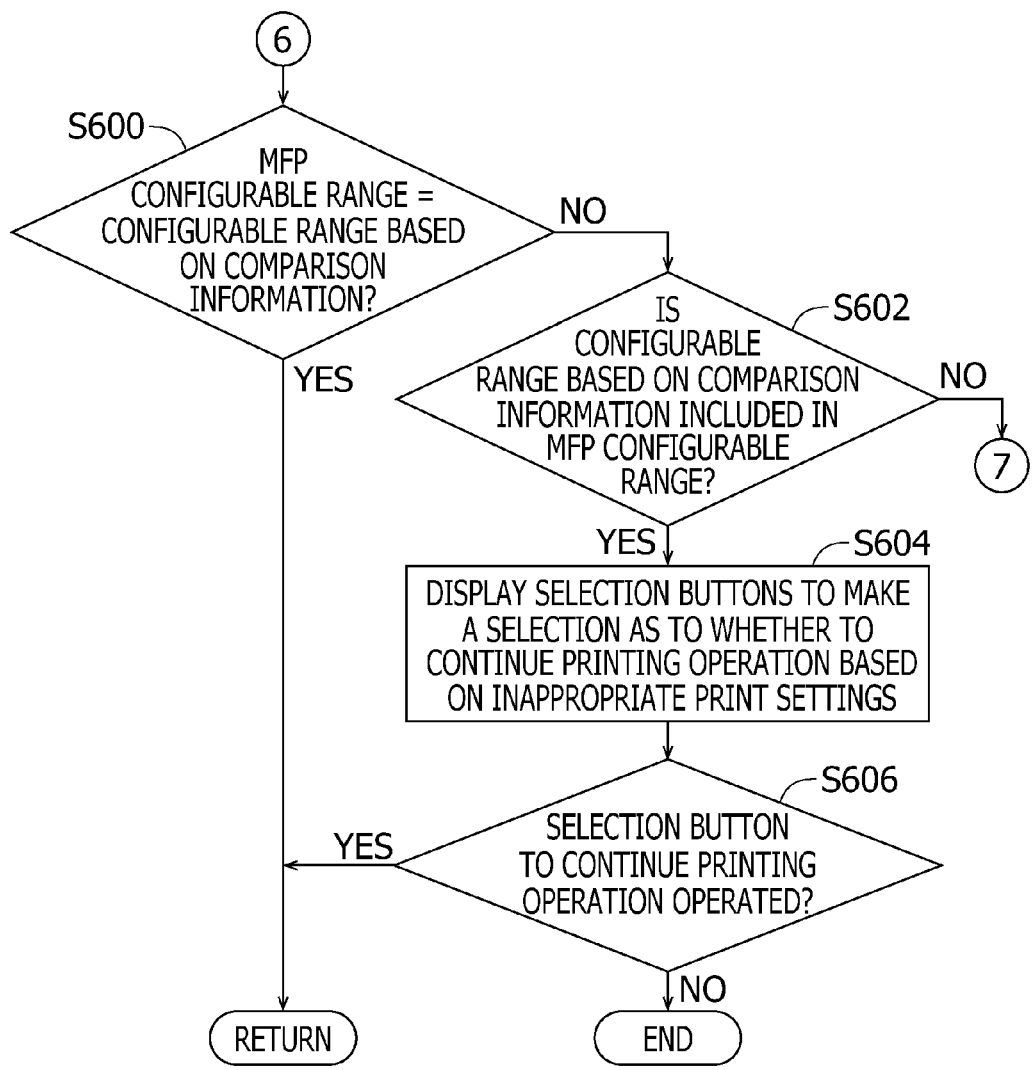
FIG. 16 is a flowchart showing a procedure of an alternate process of the process shown in FIG. 11 in a third embodiment according to one or more aspects of the present invention.

In the aforementioned first embodiment, when determining that the configurable range based on the comparison information is narrower than the MFP configurable range (i.e., the configurable range based on the comparison information is included in the MFP configurable range) (see FIG. 11; S246: Yes), the mobile phone 10 displays on the panel 22 a setting button corresponding to the MFP configurable range (see FIG. 11; S248). However, the mobile phone 10 may display on the panel 22 a selection button for accepting a user operation to determine whether to continue a printing operation. Referring to FIG. 16, an explanation will be provided about a flow for performing a printing operation using the mobile phone 10 in the third embodiment. It is noted that the flow is equivalent to the flow shown in FIGS. 9 to 12 except for the flow shown in FIG. 11. Therefore, in the third embodiment, the flow shown in FIG. 11 is replaced with a flow shown in FIG. 16. Hence, in the following description, the flow shown in FIG. 16 will be concisely explained.

In the flow shown in FIG. 16, in S600 and S602, the CPU 12 performs the same operations as those of S244 and S246 in FIG. 11, respectively. Then, the CPU 12 goes to S604. In S604, the CPU 12 outputs, via the OS 32c, screen data for causing the panel 22 to display selection buttons to make a selection as to whether to continue a printing operation based on inappropriate print settings. Then, the CPU 12 goes to S606. In S606, the CPU 12 determines whether a selection button to continue the printing operation based on the inappropriate print settings has been operated. Specifically, the CPU 12 determines whether the CPU 12 has acquired, via the OS 32c, data generated in response to an operation of the selection button to continue the printing operation based on the inappropriate print settings has been operated. When determining that the selection button to continue the printing operation based on the inappropriate print settings has been operated (S606: Yes), the CPU 12 terminates the execution of the configurable-range comparing subroutine, and goes to S208 of the main flow. Meanwhile, when determining that the selection button to continue the printing operation based on the inappropriate print settings has not been operated (S606: No), the CPU 12 terminates the execution of the configurable-range comparing subroutine, and terminates the execution of the main flow.

Thereby, it is possible to perform the printing operation according to a user's intention, and to achieve a higher level of user-friendliness of the mobile phone 10 (the communication system 1).

Fourth Embodiment

Operations of the mobile phone 10 in a fourth embodiment will be described. A configuration of the mobile phone 10 in the fourth embodiment is the same as that in the first embodiment. Therefore, an explanation of the configuration of the mobile phone 10 in the fourth embodiment will be omitted.

Figure 17:
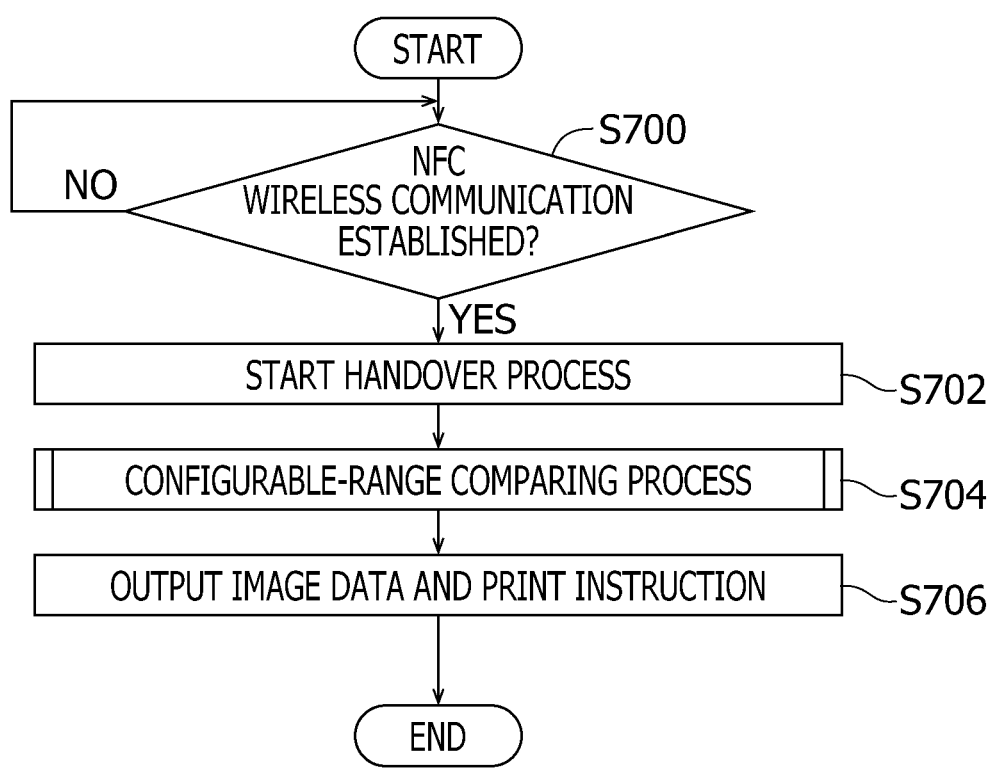
FIG. 17 is a flowchart showing a procedure of an alternate process of the process shown in FIG. 9 in a fourth embodiment according to one or more aspects of the present invention.

In the aforementioned first embodiment, the mobile phone 10 is configured to acquire the MFP configurable range via the WF wireless communication 90 or the WFD wireless communication 92. In the fourth embodiment, the mobile phone 10 is configured to acquire the MFP configurable range via the NFC wireless communication 94 in parallel with establishment of the WF wireless communication 90 or the WFD wireless communication 92. In addition, the mobile phone 10 is configured to make a comparison between the MFP configurable range and the configurable range based on the comparison information in parallel with the establishment of the WF wireless communication 90 or the WFD wireless communication 92. Referring to FIG. 17, an explanation will be provided about a flow for configuring the print settings on the mobile phone 10 in the fourth embodiment. The flow shown in FIG. 17, which is similar to the flow shown in FIG. 9, will be concisely described.

Figure 9:
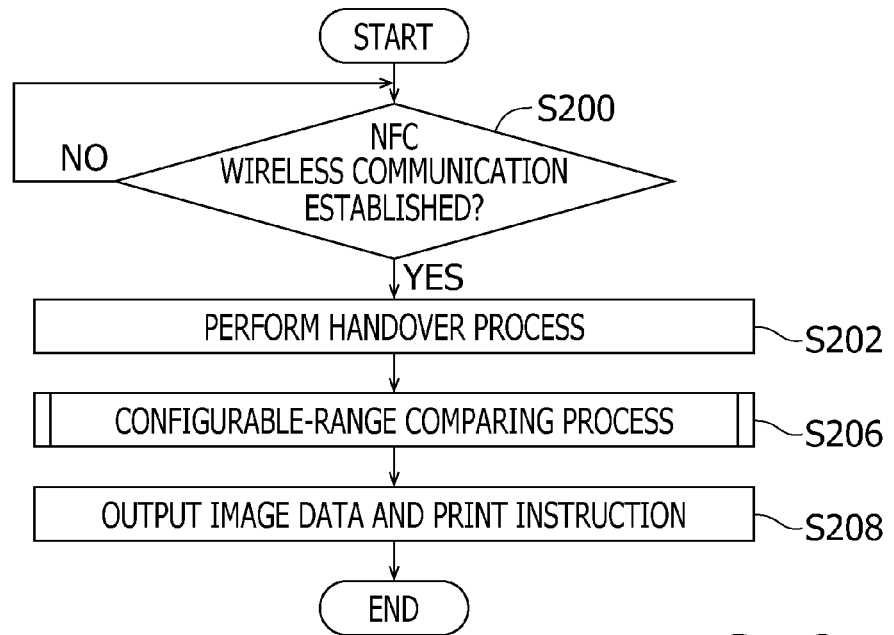

Firstly, in S700 and S702, the CPU 12 performs the same operations as S200 and S202 in FIG. 9, respectively. Then, the CPU 12 goes to S704, in which the CPU 12 performs an operation substantially identical to the operation of S206 in FIG. 9. In this respect, however, transmission of the request for the data on the MFP configurable range and receipt of the MFP configurable range are implemented via the NFC wireless communication 94.

Specifically, in a configurable-range comparing subroutine of S704, in S234, the CPU 12 outputs, via the OS 32c, a request for the print specifications of the MFP 50, that is, the data on the MFP configurable range, so as to cause the NFC I/F 20 to transmit the request to the MFP 50 via the NFC wireless communication 94. Then, the CPU 12 goes to S242, in which, when the NFC I/F 20 receives the data on the print specifications of the MFP 50, the CPU 12 acquires, via the OS 32c, the data received by the NFC I/F 20. After completion of the configurable-range comparing subroutine of S704, in S706, the CPU 12 performs the same operation as S208 in FIG. 9. Thereafter, the CPU 12 terminates the flow shown in FIG. 17.

Thus, in the fourth embodiment, the mobile phone 10 acquires the MFP configurable range via the NFC wireless communication 94 in parallel with establishment of the WF wireless communication 90 and the WFD wireless communication 92. Further, in parallel with the establishment of the WF wireless communication 90 or the WFD wireless communication 92, the mobile phone 10 makes a comparison between the MFP configurable range and the configurable range based on the comparison information. The establishment of the WF wireless communication 90 or the WFD wireless communication 92 requires a relatively long time. In the fourth embodiment, using the time for the establishment of the WF wireless communication 90 or the WFD wireless communication 92, the mobile phone 10 acquires the MFP configurable range and makes a comparison between the MFP configurable range and the configurable range based on the comparison information. Thereby, it is possible to shorten a time required for the printing operation.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth (such as specific materials, structures, chemicals, processes, etc.) in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiments will be omitted.

[Modifications]

In the aforementioned fourth embodiment, the acquisition of the MFP configurable range and the comparison between the MFP configurable range and the configurable range based on the comparison information are carried out in parallel with the establishment of the WF wireless communication 90 or the WFD wireless communication 92. Optionally, various settings may be configured in parallel with the establishment of the WF wireless communication 90 or the WFD wireless communication 92. The various settings may include setting values for the print settings that are not used for the comparison between the MFP configurable range and the configurable range based on the comparison information. More specifically, the various settings may include a setting value for the number of print copies. Further, the various settings may include settings not related to the print settings.

Further, the wireless communication established by the handover process is not limited to the WF wireless communication or the WFD wireless communication, but may include various types of wireless communication that achieve higher-speed communication than the NFC wireless communication. For instance, Bluetooth® (trademark registered by BLUETOOTH SIG, INC.) may be exemplified as wireless communication established by the handover technique.

Further, the wireless communication established by the handover process is not limited to the WF wireless communication or the WFD wireless communication, but may include various types of wireless communication that achieve longer-distance communication than NFC wireless communication. For instance, Bluetooth® (trademark registered by BLUETOOTH SIG, INC.) may be exemplified as wireless communication established by the handover technique.

Further, the setting values of the print settings for the printing operation are not limited to numerical values but may include flags or character strings.

Further, the image data transmitted from the mobile phone 10 to the MFP 50 may be image data expressing images to be printed, or image data processed so as to allow the MFP 50 to perform printing in accordance with setting values of the image data.

Further, the default setting values may be values previously programmed in the print processing application 32*a*, or values stored into the storage unit 14 of the mobile phone 10 when the print processing application 32*a* is installed into the mobile phone 10.

Further, the specification information corresponding to the model name may be information stored into the storage unit 14 of the mobile phone 10 when the print processing application 32*a* is installed into the mobile phone 10.

Further, in the case where the CPU 12 has acquired, as the comparison information, the model information as the information on the print specifications of the selected printer, when the model information of the selected printer is coincident with the model information of the MFP 50, the CPU 12 may determine that the MFP configurable range is equal to the selected-printer configurable range. Further, when it is possible to determine that the MFP 50 has the same specifications as those of the selected printer only by comparison between the model information of the MFP 50 and the model information of the selected printer, the CPU 12 may determine that the MFP configurable range is equal to the selected-printer configurable range.

Further, in the aforementioned fourth embodiment, the configurable-range comparing subroutine (see FIG. 17, S704) may be executed in parallel with the handover process (see FIG. 17, S702).

Further, along with displaying the setting button corresponding to the MFP configurable range (see FIG. 11, S248), the CPU 12 may cause the panel 22 to display a message informing that a print instruction is restricted once from being output because of the current configurable range being limited to the configurable range of the selected printer.

Further, along with displaying the setting button corresponding to the MFP configurable range (see FIG. 11, S248), the CPU 12 may cause the panel 22 to display a cancel button for canceling the printing operation. In this case, when the cancel button is operated, the CPU 12 may go to S208 of the main flow.

Further, instead of displaying the setting button corresponding to the MFP configurable range (see FIG. 11, S248), the CPU 12 may cause the panel 22 to display a print setting screen for configuring setting values within the configurable range limited based on the print specifications of the MFP 50, in a method equivalent to the method applied to S118. When the print setting screen is displayed, the CPU 12 may go to S252 in response to an operation of a return key. Furthermore, along with displaying the print setting screen, the CPU 12 may cause the panel 22 to display a message informing that a print instruction is restricted once from being output because of the current configurable range being limited to the configurable range of the selected printer.

Further, the operation of determining whether the MFP configurable range is coincident with the configurable range based on the comparison information (S244) and the operation of determining whether the configurable range based on the comparison information is narrower than the MFP configurable range (i.e., whether the configurable range based on the comparison information is included in the MFP configurable range) (S246) may be transposed to each other.

In this case, after completion of S242, the CPU 12 may execute S246. Then, when determining that the configurable range based on the comparison information is narrower than the MFP configurable range (i.e., the configurable range based on the comparison information is included in the MFP configurable range) (S246: Yes), the CPU 12 may execute S248 and the subsequent steps. Meanwhile, when determining that the configurable range based on the comparison information is not narrower than the MFP configurable range (i.e., the configurable range based on the comparison information is not included in the MFP configurable range) (S246: No), the CPU 12 may execute the operation of S244. Then, when determining that the MFP configurable range is coincident with the configurable range based on the comparison information (S244: Yes), the CPU 12 may go to S208 of the main flow. Meanwhile, when determining that the MFP configurable range is not coincident with the configurable range based on the comparison information (S244: No), the CPU 12 may execute the operation of S256.

Further, the device configured to issue a print instruction based on the comparison between the print specifications of the selected printer and the print specifications of the MFP 50 is not limited to the mobile phone 10, but may include a desktop computer, a notebook computer, a tablet device, and a smartphone.

Further, aspects of the present invention may be applied to various kinds of image processing (such as an image scanning operation, a facsimile operation, and a copy operation) as well as a printing operation.

Further, instead of the NFC wireless communication exemplified in the aforementioned embodiments, Transfer Jet wireless communication may be applied. In this case, the wireless communication established by the handover process is not limited to the WF wireless communication or the WFD wireless communication, but may include various types of wireless communication that achieve higher-speed communication than the Transfer Jet wireless communication, and various types of wireless communication that achieve longer-distance communication than the Transfer Jet wireless communication.

The aforementioned embodiments provide examples where the CPU 12 of the mobile phone 10 is configured to execute various operations based on the print processing application 32a. However, the CPU 12 of the mobile phone 10 may be configured to issue, based on the print processing application 32a, instructions to cause other elements (such as the OS 32c, other systems, and hardware elements) to execute various operations.

In the aforementioned embodiments, the CPU 12 is configured to execute the print processing application 32a, and thereby perform the flow shown in FIGS. 5 to 8. However, the CPU 12 may be configured to execute only the operation of S136 in this flow. Further, the CPU 12 may be configured to execute one or more operations of this flow other than the operation of S136, in addition to the operation of S136.

Further, in the aforementioned embodiments, the CPU 12 is configured to execute the print processing application 32a, and thereby perform the flow shown in FIGS. 9 to 12. However, the CPU 12 may be configured to perform this flow without executing S200 to S204, S230, S236 to S240, or S246 to S262. In this case, the CPU 12 may firstly execute S232 to S244 after launching this flow. Then, the CPU may execute S208 when determining that the MFP configurable range is equal to the selected-printer configurable range (S244: Yes). Meanwhile, the CPU may terminate this flow without executing S208 when determining that the MFP configurable range is not equal to the selected-printer configurable range (S244: No). It is noted that, instead of not executing all the steps S200 to S204, S230, S236 to S240, and S246 to S262, the CPU 12 may be configured to additionally execute one or more steps of S200 to S204, S230, S236 to S240, and S246 to S262.

The mobile phone 10 may include a plurality of display units such as a display panel usable when a cover is open and a display panel usable when the cover is closed. The mobile phone 10 may include a plurality of operable input units such as a touch panel usable when the cover is open and a touch panel usable when the cover is closed. Alternatively, the mobile phone 10 may include a plurality of operable input units such as a touch panel and a keyboard.

Each program exemplified in the aforementioned embodiment may include only a single program module, or may include a plurality of program modules. Each individual configuration exemplified in the aforementioned embodiment may be replaced with a replaceable different configuration. Aspects of the present invention may be achieved by, as well as the CPU 12 executing the print processing application 32a, various configurations such as a computer executing a program (e.g., an operating system, an application, or a program) other than the print processing application 32a, a hardware element (e.g., the panel 22) operating in accordance with instructions from a computer, a configuration of a computer and a hardware element that operate in collaboration with each other, a computer executing a plurality of programs in collaboration with each other, and a hardware configuration that operates in accordance with instructions from a computer executing a plurality of programs in collaboration with each other.

What is claimed is:

1. A communication device comprising:
    a first communication interface;
    a second communication interface;
    an input interface;
    a storage; and
    a processor configured to, when executing processor-executable instructions stored in the storage, cause the communication device to perform:
        prior to near-field wireless communication being established with an image processing apparatus, accepting a first setting value within a first configurable range, the first configurable range including settable values stored in the storage;
        storing the accepted first setting value into the storage;
        establishing the near-field wireless communication with the image processing apparatus via the first communication interface;
        in response to the near-field wireless communication being established, establishing long-distance wireless communication with the image processing apparatus via the second communication interface, the long-distance wireless communication having a longer communicable distance than the near-field wireless communication;
        in response to the long-distance wireless communication being established, acquiring a second configurable range from the image processing apparatus, the second configurable range being different from the first configurable range and including settable values for image processing executable by the image processing apparatus, wherein the settable values of the second configurable range includes at least one setting value not included in the settable values of the first configurable range;

in response to acquiring the second configurable range, displaying, on the input interface, a setting button to enable setting of a second setting value within the second configurable range;

accepting the second setting value via the input interface; and transmitting, when at least one condition is satisfied, an image processing instruction to perform image processing based on the second setting value, to the image processing apparatus via the second communication interface.

2. The communication device according to claim 1, wherein the processor is further configured to, when executing the processor-executable instructions, cause the communication device to perform:

determining whether the first configurable range is included in the second configurable range; and restricting transmission of a particular image processing instruction to perform image processing based on the first setting value stored in the storage the image processing apparatus when determining that the first configurable range is included in the second configurable range.

3. The communication device according to claim 2, wherein the processor is further configured to, when executing the processor-executable instructions, cause the communication device to perform:

acquiring a current setting value set on the communication device, the current setting value being within the first configurable range;

determining whether the current setting value is within the second configurable range, when determining that the first configurable range is not included in the second configurable range;

transmitting an image processing instruction to perform image processing based on the current setting value to the image processing apparatus, when determining that the first configurable range is not included in the second configurable range, and that the current setting value is within the second configurable range; and restricting transmission of the image processing instruction based on the current setting value to the image processing apparatus, when determining that the first configurable range is not included in the second configurable range, and that the current setting value is out of the second configurable range.

4. The communication device according to claim 3, wherein the processor is further configured to cause the communication device to, when determining that the first configurable range is not included in the second configurable range and that the current setting value is out of the second configurable range, not transmit the image processing instruction based on the current setting value to the image processing apparatus.

5. The communication device according to claim 2, further comprising a display, wherein the processor is further configured to cause the communication device to, when restricting transmission of the particular image processing instruction to the image processing apparatus, output screen data for causing the display to display a notification informing that transmission of the particular image processing instruction is restricted.

6. The communication device according to claim 5, wherein the processor is further configured to cause the communication device to, when determining that the first configurable range is included in the second configurable range, output screen data for causing the display to display a setting value that is within the second configurable range and out of the first configurable range.

7. The communication device according to claim 6, wherein the processor is further configured to cause the communication device to, when determining that the first configurable range is included in the second configurable range, output screen data for causing the display to display an acceptor, the acceptor being configured to accept a setting value to be stored into the storage, in response to a user operation on the acceptor.

8. The communication device according to claim 7, wherein the acceptor is further configured to, in response to a user operation on the acceptor, accept a setting value that is within the second configurable range and out of the first configurable range.

9. The communication device according to claim 7, wherein the processor is further configured to cause the communication device to, in response to the accepted setting value being stored into the storage, transmit an image processing instruction to perform image processing based on the setting value accepted via the acceptor.

10. The communication device according to claim 9, wherein the processor is further configured to cause the communication device to, even when the setting value accepted via the acceptor is not stored into the storage, transmit the image processing instruction based on the accepted setting value in response to a user operation to permit transmission of the image processing instruction.

11. The communication device according to claim 5, wherein the processor is further configured to, when executing the processor-executable instructions, cause the communication device to perform:

acquiring a current setting value set on the communication device, the current setting value being within the first configurable range; and outputting screen data for causing the display to display a notification informing that it is not possible to cause the image processing apparatus to perform image processing based on the current setting value, when determining that the first configurable range is not included in the second configurable range, and that the current setting value is out of the second configurable range.

12. The communication device according to claim 2, wherein the processor is further configured to, when executing the processor-executable instructions, cause the communication device to perform:

acquiring a default setting value previously set for image processing; and transmitting to the image processing apparatus an image processing instruction to perform image processing based on the default setting value that is within the second configurable range.

13. The communication device according to claim 2, wherein the processor is further configured to, when executing the processor-executable instructions, cause the communication device to perform:

outputting identification data of a specific image processing device to store the identification data into the storage, in response to acceptance of a selection of the specific image processing device from among image processing devices communicable with the communication device via the second communication interface;

in response to acceptance of a transmission instructing operation, transmitting the particular image processing instruction to the specific image processing device via the second communication interface, the specific image processing device being identified by the identification data stored in the storage;

determining, as the first configurable range, a specific configurable range including setting values settable for image processing executable by the specific image processing device; and restricting transmission of the particular image processing instruction to the image processing apparatus, when determining that the specific configurable range corresponding to the first configurable range is different from the second configurable range acquired from the image processing apparatus.

14. The communication device according to claim 13, further comprising a display, wherein the processor is further configured to, when executing the processor-executable instructions, cause the communication device to perform:

acquiring the specific configurable range from the specific image processing device via the second communication interface;

determining the acquired specific configurable range as the first configurable range, by outputting screen data for causing the display to display an acceptor, the acceptor being configured to accept a setting value within the acquired specific configurable range in response to a user operation on the acceptor; and restricting transmission of the image processing instruction based on the setting value accepted via the acceptor to the image processing apparatus, when determining that the acquired specific configurable range corresponding to the first configurable range is different from the second configurable range acquired from the image processing apparatus.

15. The communication device according to claim 1, wherein the processor is further configured to cause the communication device to acquire the second configurable range from the image processing apparatus via the second communication interface.

16. A non-transitory computer readable medium storing computer readable instructions that, when executed, cause a communication device to:

prior to near-field wireless communication being established with an image processing apparatus, accept a first setting value within a first configurable range, the first configurable range including settable values stored in a storage of the communication device;

store the accepted first setting value into the storage;

establish the near-field wireless communication with the image processing apparatus via a first communication interface of the communication device;

in response to the near-field wireless communication being established, establish long-distance wireless communication with the image processing apparatus via a second communication interface of the communication device, the long-distance wireless communication having a longer communicable distance than the near-field wireless communication;

in response to the long-distance wireless communication being established, acquire a second configurable range from the image processing apparatus, the second configurable range being different from the first configurable range and including settable values for image processing executable by the image processing apparatus, wherein the settable values of the second configurable range includes at least one setting value not included in the settable values of the first configurable range;

in response to acquiring the second configurable range, display, on an input interface of the communication device, a setting button to enable setting of a second setting value within the second configurable range;

accept the second setting value via the input interface; and transmit, when at least one condition is satisfied, an image processing instruction to perform image processing based on the second setting value, to the image processing apparatus via the second communication interface.

17. A method comprising:

prior to near-field wireless communication being established with an image processing apparatus, accepting, by a communication device, a first setting value within a first configurable range, the first configurable range including settable values stored in a storage of the communication device;

storing, by the communication device, the accepted first setting value into the storage;

establishing, by the communication device, the near-field wireless communication with the image processing apparatus via a first communication interface of the communication device;

in response to the near-field wireless communication being established, establishing, by the communication device, long-distance wireless communication with the image processing apparatus via a second communication interface of the communication device, the long-distance wireless communication having a longer communicable distance than the near-field wireless communication;

in response to the long-distance wireless communication being established, acquiring, by the communication device, a second configurable range from the image processing apparatus, the second configurable range being different from the first configurable range and including settable values for image processing executable by the image processing apparatus, wherein the settable values of the second configurable range includes at least one setting value not included in the settable values of the first configurable range;

in response to acquiring the second configurable range, displaying, on an input interface of the communication device, a setting button to enable setting of a second setting value within the second configurable range;

accepting, by the communication device, the second setting value via the input interface; and transmitting, by the communication device and when at least one condition is satisfied, an image processing instruction to perform image processing based on the second setting value, to the image processing apparatus via the second communication interface.

* * * * *